United States Patent [19]

Uchida et al.

[11] Patent Number: 5,659,878

[45] Date of Patent: Aug. 19, 1997

[54] MOBILE COMMUNICATION SYSTEM WITH SATELLITE COMMUNICATION HAND OFF CAPABILITY

[75] Inventors: Yoshinori Uchida; Masako Kimura, both of Hyogo; Kenichi Ishida, Kanagawa, all of Japan

[73] Assignee: Mitsubishi Denki Kabushiki Kaisha, Tokyo, Japan

[21] Appl. No.: 321,609

[22] Filed: Oct. 12, 1994

[30] Foreign Application Priority Data

Nov. 29, 1993 [JP] Japan .................... 5-298417

[51] Int. Cl.$^6$ ................................... H04B 7/185
[52] U.S. Cl. .................. 455/426; 455/428; 455/432; 455/436
[58] Field of Search .................. 453/12.1, 13.1, 453/13.2, 33.1, 33.2, 33.3; 379/59, 60

[56] References Cited

U.S. PATENT DOCUMENTS

| | | | |
|---|---|---|---|
| 5,081,703 | 1/1992 | Lee | 455/13.1 |
| 5,280,521 | 1/1994 | Itoh | 455/12.1 |
| 5,303,286 | 4/1994 | Wiedeman | 379/59 |
| 5,448,623 | 9/1995 | Wiedeman et al. | 455/12.1 |

FOREIGN PATENT DOCUMENTS 0536921  4/1993  European Pat. Off. .

*Primary Examiner*—Edward F. Urban
*Attorney, Agent, or Firm*—Rothwell, Figg, Ernst & Kurz

[57] ABSTRACT

The mobile communication system comprising a public network, a private system connected to the public network and a satellite system connected to the public network. The private system includes a radio base station which has a communication zone, a first mobile telephone which is able to communicate with the radio base station in the communication zone and is able to communicate with the satellite system, and a private branch exchange connected to both the public network and the radio base station which performs communication processes between the public network and the private system. The radio base station and the first mobile telephone are able to process a private protocol and a public protocol. The satellite system includes a satellite station which relays radio waves on a satellite line, and a satellite ground station which is able to communicate with the satellite station and is connected to the public network. When the first mobile telephone roams to the satellite system, the private branch exchange transfers information of the first mobile telephone for roaming to the satellite ground station via the public network before changing communication lines.

7 Claims, 32 Drawing Sheets

FIG.23

| | 32a REQUEST OF HAND OVER | 32b HAND OVER ACCEPTABLE OR NOT? |
|---|:---:|:---:|
| 32c — A. MOBILE TELEPHONE NUMBER (DISCRIMINATION OF CALL IN / CALL OUT) | ○ | |
| 32d — B. WHETHER A MOBILE TELEPHONE BELONGS TO THE SYSTEM OR NOT | ○ | |
| 32e — C. COUNTERPART NUMBER | ○ | ○ |
| 32f — D. WHETHER THE MOBILE TELEPHONE ACCEPTS ACCOUNTING OR NOT | ○ | |
| 32g — a. SYSTEM INFORMATION ABOUT A DESTINATION OF ROAMING | ○ | |
| 32h — b. BASE STATION NUMBER IN A DESTINATION SYSTEM OF ROAMING | ○ | |
| 32i — c. WHETHER ACCEPTING ACCOUNTING IS REQUIRED AT ROAMING DESTINATION OR NOT | ○ | |
| 32k — d. INFORMATION ABOUT WHETHER HAND OVER IS ACCEPTABLE OR NOT | | ○ |
| 32m — e. Tch SWITCHING INFORMATION (DESTINATION ID OF SWITCHING) (TIME SLOT NUMBER) (CARRIER NUMBER) | | ○ |

ITEMS USED IN EACH PROTOCOL ARE DESIGNATED BY ○.

FIG.26

| | REQUEST OF HAND OVER (35a) | HAND OVER ACCEPTABLE OR NOT? (35b) |
|---|---|---|
| 35c — A. MOBILE TELEPHONE NUMBER (DISCRIMINATION OF CALL IN / CALL OUT) | ○ | |
| 35d — B. WHETHER A MOBILE TELEPHONE BELONGS TO THE SYSTEM OR NOT | | ○ |
| 35e — C. COUNTERPART NUMBER | | ○ |
| 35f — D. WHETHER THE MOBILE TELEPHONE ACCEPTS ACCOUNTING OR NOT | ○ | |
| 35g — a. SYSTEM INFORMATION ABOUT A DESTINATION OF ROAMING | ○ | |
| 35h — b. BASE STATION NUMBER IN A DESTINATION SYSTEM OF ROAMING | | ○ |
| 35i — c. WHETHER ACCEPTING ACCOUNTING IS REQUIRED AT ROAMING DESTNATION | ○ | |
| 35k — e. INFORMATION ABOUT WHETHER HAND OVER IS ACCEPTABLE OR NOT | | ○ |
| 35m — f. MOBILE TELEPHONE ACCOUNTING NUMBER | ○ | |
| 35n — g. TCH SWITCHING INFORMATION (DESTINATION ID OF SWITCHING) (TIME SLOT NUMBER) (CARRIER NUMBER) | | ○ |

ITEMS USED IN EACH PROTOCOL ARE DESIGNATED BY ○.

MOBILE COMMUNICATION SYSTEM WITH SATELLITE COMMUNICATION HAND OFF CAPABILITY

BACKGROUND OF THE INVENTION

1. Field of the Invention

The present invention relates to a mobile communication system enabling a mobile telephone being connected with the system to continue to connect the system when the mobile radio telephone is moved in an area where there is no ground stations by roaming or hand-over via a satellite communication.

2. Description of the Prior Art

FIG. 1 is a system configuration diagram showing a conventional mobile communication system. In this figure, reference numeral 1 denotes a public network, reference numeral 2 denotes a private system A which is a mobile communication system connected to the network 1. Reference numeral 3 denotes a private branch exchange hereinafter referred to as PBX, which employs, for example, an electronic exchange device. Reference numerals 4a, 4b, 4e and 4f denote a radio base station which is under control of PBX 3 and covers a respective communication zone. Reference numerals 5, 6a and 6b denote a mobile telephone carried by a user, which is connected to one of the radio base stations 4a, 4b, 4e and 4f by radio wave. In this application, the word "mobile" is so defined as to include the word "portable".

Reference numeral 10 denotes a private system B which is a mobile communication system, being connected to the public network 1. Reference numeral 11 denotes a PBX for the private system B. Reference numerals 12h and 12i denote a radio base station which is under control of the PBX 11 and covers a respective communication zone. Reference numeral 13 denotes a mobile telephone carried by a user and is connected to one of the radio base stations 12h, 12i by radio wave.

FIG. 2 is a system configuration diagram showing another conventional mobile communication network. In the figure, the same reference numerals are attached to the same elements as those in FIG. 1 and duplicate explanations are omitted.

Reference numerals 8h and 8i denote a public radio base station which is connected to the public network 1 and covers a respective communication zone. Reference numeral 9 denotes a mobile telephone carried by a user, which is to be connected to one of the public radio base stations 8h and 8i.

FIG. 3 is a functional block diagram showing a construction of the mobile telephone 5. In this figure, reference numeral 41 denotes a private protocol processing section which processes a private protocol of the private system, reference numeral 42 denotes a private control channel controlling section which controls private control channel for sending the private protocol. Reference numeral 43 denotes a public protocol processing section which processes a public protocol for accessing the public network 1. Reference numeral 44 denotes a public control channel controlling section which controls a public control channel for public protocol transmission. Reference numeral 45 denotes a transmitting/receiving section which is switched over by the switch 47 and is connected either to the private control channel controlling section or to the public control channel controlling section 44.

FIG. 4 is a functional block diagram showing a structure of a mobile telephone used in another mobile communication system. In the figure, the same reference numerals are attached to the same elements as those in FIG. 3 and duplicate explanations are omitted.

As shown in the FIG. 4, switches 46a and 46b are added to the mobile telephone illustrated in FIG. 3. The switch 46b is provided in order to connect the private protocol processing section 41 with the private control channel controlling section 42 and in order to connect the public protocol processing section 43 with the private control channel controlling section 42 via the switch 46a. The switch 46a is also used for connecting public protocol processing section 43 with public control channel controlling section 44.

FIG. 5 is a functional block diagram showing a structure of the radio base stations 4a–4f of the private system A illustrated in FIG. 2. These radio base stations are used in a mobile communication system where a PBX is installed which has a function to pass the information relevant to a mobile telephone which does not belong to the system A to the public network 1. In FIG. 5, reference numeral 51 denotes a transmitting/receiving section which is to be connected to the transmitting/receiving section 45 of the mobile telephone 6 by radio wave. Reference numeral 52 denotes a private protocol processing section which controls the private control channel. Reference numeral 53 denotes a private protocol processing section which processes a private protocol. Reference numeral 54 denotes a public protocol processing section which processes a public protocol. Reference numeral 55 denotes a line processing section which connects the radio base station to the PBX 3.

FIG. 6 is a functional block diagram showing a structure of the PBX 3. In FIG. 6, reference numeral 61 denotes a line interface to which the radio base stations are connected. Reference numeral 62 denotes a system discriminating function section which determines whether a received call is issued from a mobile telephone 5 belonging to the own system or it is issued from a mobile telephone 6 not belonging to the other private system. Reference numeral 63 denotes a private protocol controlling section which controls a call when the result of determination by the system discriminating function section is the own system. Reference numeral 64 denotes a different system protocol controlling section which connects a call to the public system when the result of the determination by the system discriminating function section 62 is different system. Reference numeral 65 is a network interface which connects the private protocol controlling section 63 and the different system controlling section 64 to the public network 1.

In FIG. 2, a connection request for the subscriber's telephone 25 of the public network 1 from the mobile telephone 9 is processed at the public protocol processing section 43 and an access to the public network 1 is made from transmitting/receiving section 45 under the control of the public control channel controlling section 44. In this case, therefore, identification and accounting are performed at the public protocol processing section 43 of the mobile telephone 9.

On the other hand, a connection request for the own system from the mobile telephone 5, 6a, or 6b is processed at each private protocol processing section 41 as shown in FIG. 3 and sent to the private control channel controlling section 42. Under the control of the private control channel controlling section 42, the request is sent from the transmitting/receiving section 45 to the radio base station 4 whose communication zone the mobile telephone 5 exits in.

At the radio base station 4, the transmitting/receiving section 51 receives the request and sends it to the private protocol processing section 53 via the private control channel controlling section 52 and the request is processed there and sent to the PBX 3 via the line processing section 55.

A connection request to the public network 1 via the private system A from the mobile telephones 6a, or 6b of FIG. 1, which does not belongs to the private system A, is processed at the public protocol processing section 43 of each mobile telephone, which is shown in FIG. 4, and is sent to the private control channel controlling section 42. Under the control of the public protocol processing section 43, the request is sent from the transmitting/receiving section 45 to the radio base station 4.

At the radio base station 4, the transmitting/receiving section 51 of FIG. 5 receives the request and sends it to the public protocol processing section 54 via the private control channel controlling section 52 and the request is processed there and sent to the PBX 3 via the line processing section 55.

The PBX 3 has a function to access calls from the own system only on private control channels. A connection request from the radio base station 4 is received at the line interface 61 of FIG. 6 and is sent to the system discriminating function section 62.

FIG. 7 shows the system identifier 222 of the control information 22 included in the connection request.

FIG. 8 is a flowchart showing the operation of the system discriminating function section. The system discriminating function section 62 compares the system identifier 222 at step S801 and judges whether the connection request is sent from the mobile telephone 5 which belongs to the own system or from the mobile telephone of the other private system at step S802. When the request is sent from the mobile telephone which does not belong to the own system at step S804, a procedure that the mobile telephone 6 carries out the authentication and accounting of the connection to the public system for this connection request is made at step S805 by the different system protocol controlling section 64.

On the other hand, as a result of the discrimination of the system discrimination function section 62, when the request is sent from the mobile telephone 5 which belongs to the own system, the PBX 3 performs the connection if the connection request is a connection request within the system. Further, if the connection is a public connection request, the request is sent from the own system protocol controlling section 63 to the public network 1 via the network interface 65. When the request is sent to the public network 1, the PBX 3 itself performs authentication and accounting processes.

Documents in relation to the above described conventional art of the mobile communication system include "Second Generation Wireless Telephone System, 1st ed. Standard RCR STD-28" published by Research and Development Center for Radio systems and Japanese Patent Application Laid-Open No. 2-192329.

Since the conventional mobile communication system is constructed as explained above, there is a problem that when the mobile telephone 5 connected to the radio base station 4 in the private system 2 moves out of the communication zone of the private system 2 while making a communication and the mobile telephone 5 is out of the coverage of the communication zone of the other system, a line connection to and from the mobile telephone 5 cannot be made.

SUMMARY OF THE INVENTION

This invention is accomplished in view of the above problem and the object of the invention is to provide a mobile communication system wherein a communication to and from the mobile telephone is possible even if the mobile telephone moves out of the coverage of the private system.

The mobile communication system of this invention comprises a public network, a private system connected to the public network and a satellite system connected to the public network. The private system includes a radio base station which has a communication zone, a first mobile telephone which is able to communicate with the radio base station in the communication zone and is able to communicate with the satellite system, and a private branch exchange connected to both the public network and the radio base station which performs communication processes between the public network and the private system. The radio base station and the first mobile telephone are able to process a private protocol and a public protocol. The satellite system includes at least a satellite station which relays radio waves on a satellite line, and a satellite ground station which is able to communicate with the satellite station and is connected to the public network.

When the first mobile telephone roams to said satellite system, the private branch exchange transfers information of the first mobile telephone for roaming to the satellite ground station via the public network before changing communication lines.

BRIEF DESCRIPTION OF THE DRAWINGS

FIG. 23 shows a protocol information.

FIG. 26 is a list of protocol information including accounting information in the case of roaming.

DETAILED DESCRIPTION OF THE PREFERRED EMBODIMENTS

Figure 1:
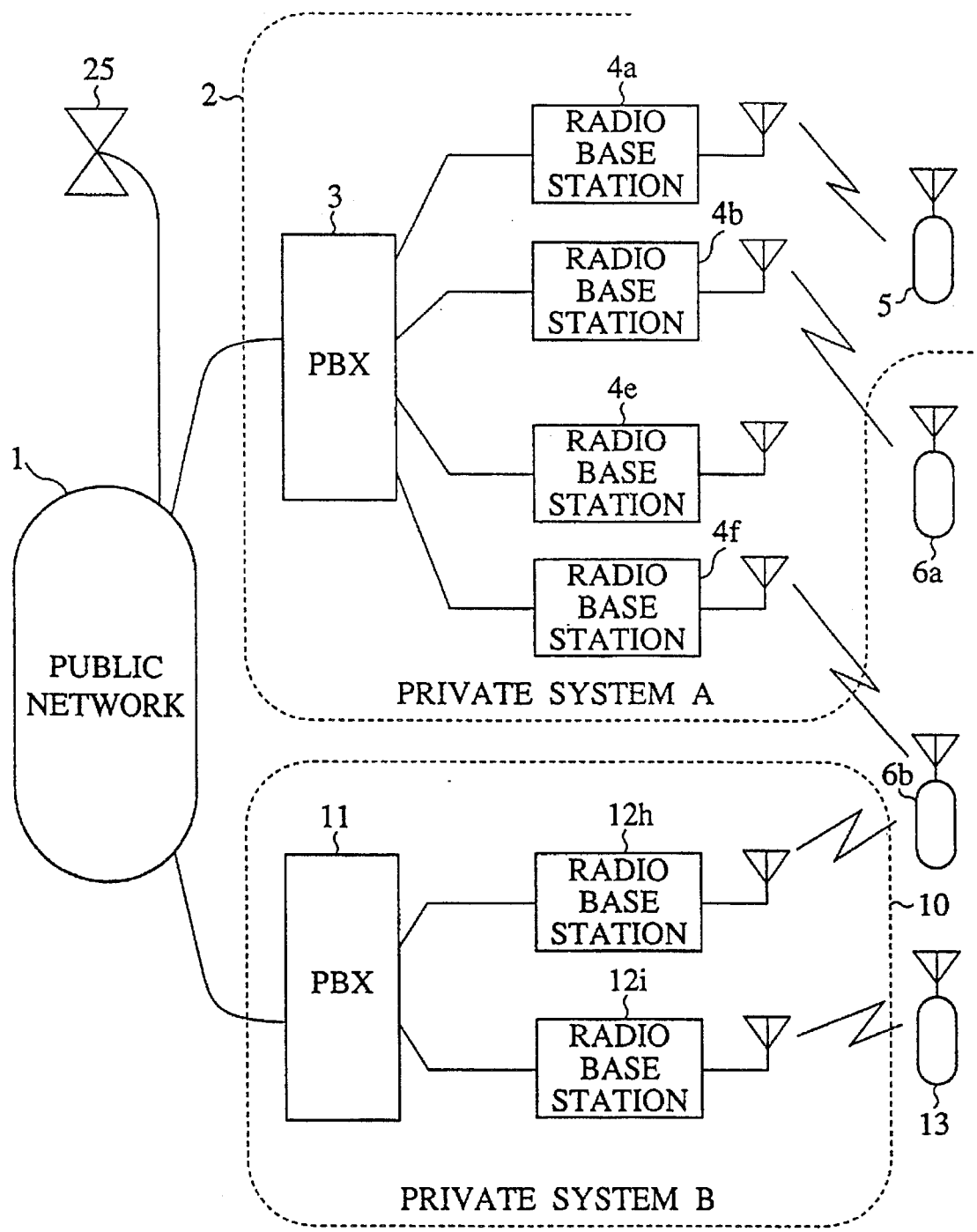
FIG. 1 is a system configuration diagram showing a conventional mobile communication system.
Figure 2:
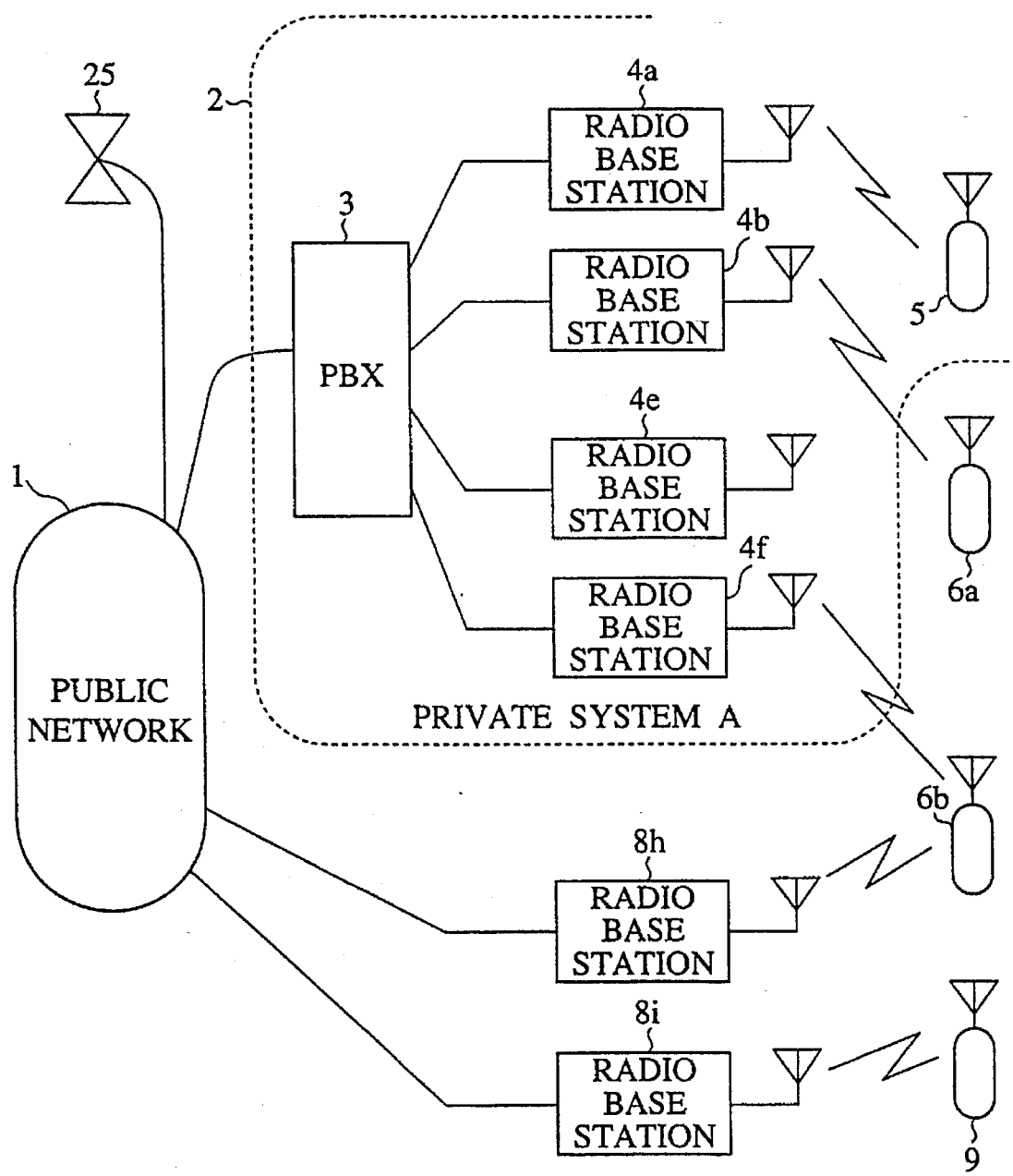
FIG. 2 is a system configuration diagram showing another conventional mobile communication network.
Figure 3:
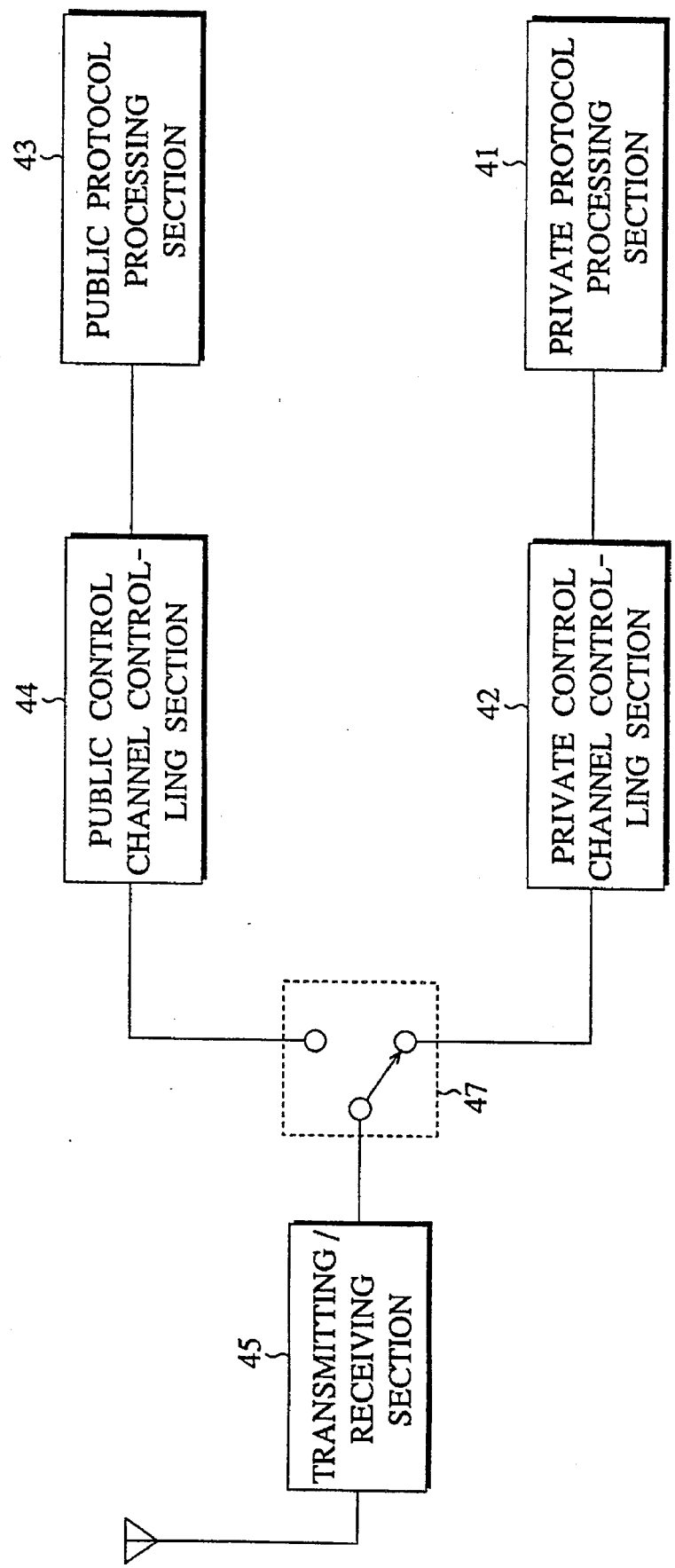
FIG. 3 is a functional block diagram showing a construction of the mobile telephone.

The preferred embodiments will be explained in detail referring to the drawings.

Figure 9:
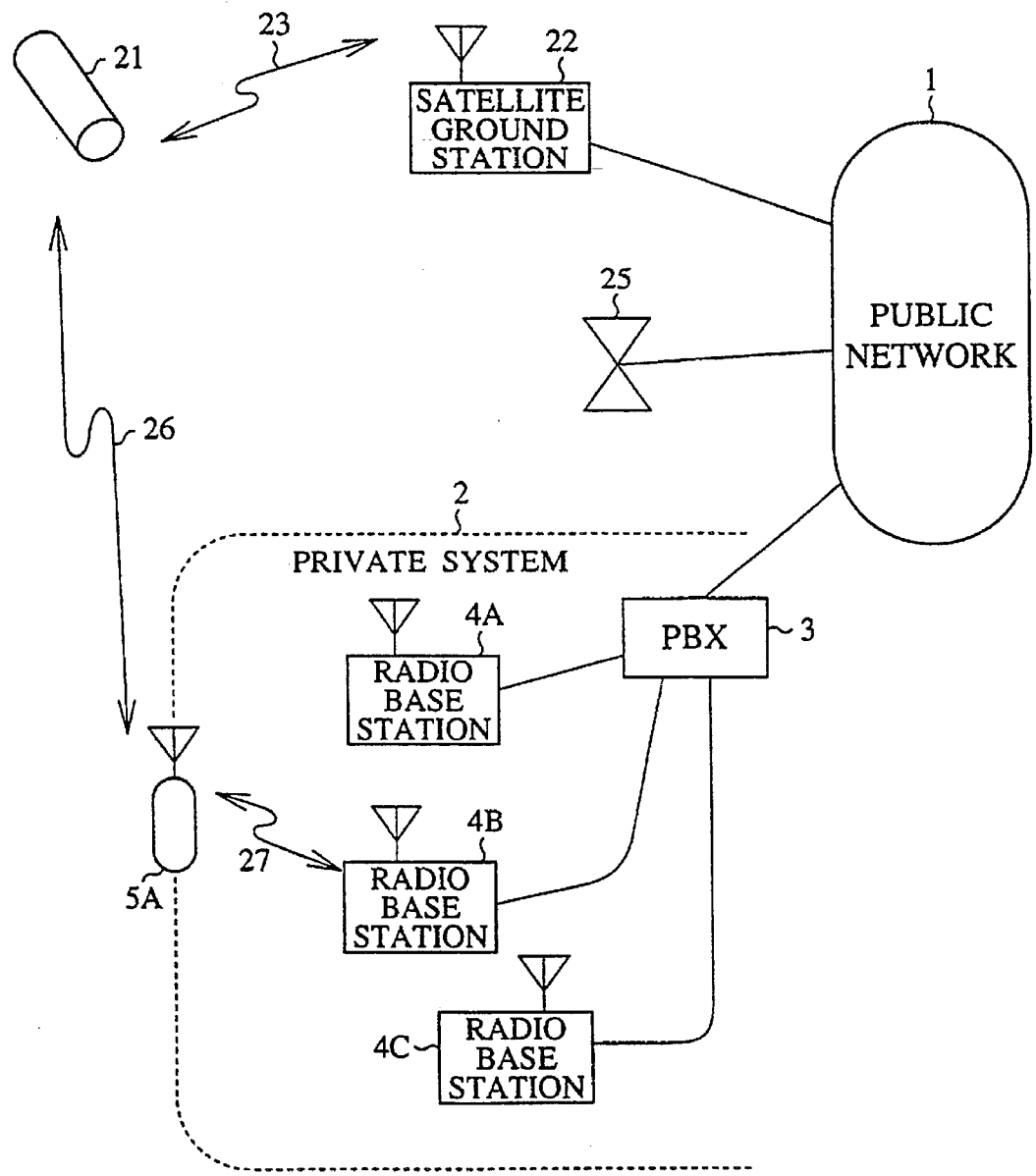
FIG. 9 is a schematic drawing showing a whole mobile communication system according to the present invention.

FIG. 9 is a schematic drawing showing a whole mobile communication system according to the present invention.

In FIG. 9, reference numeral 1 denotes a public network, reference numeral 2 denotes a private system, reference numeral 3 denotes a Private Branch eXchange (PBX), reference numerals 4A, 4B and 4C denote a radio base station in the private system 2, reference numeral 5A denotes a mobile telephone in the private system 2, reference numeral 21 denotes a geostationary communication satellite, reference numeral 22 denotes a satellite ground station, reference numeral 23 denotes a trunk type communication channel connecting the satellite 21 with the satellite ground station 22 by radio wave, reference numeral 25 denotes a subscriber's telephone connected to the public network 1, reference numeral 26 denotes a communication line connecting the mobile telephone 5A with the satellite 21 by radio wave, reference numeral 27 denotes a communication line connecting the mobile telephone 5A with one of the radio base stations 4A, 4B and 4C by radio wave.

Figure 10:
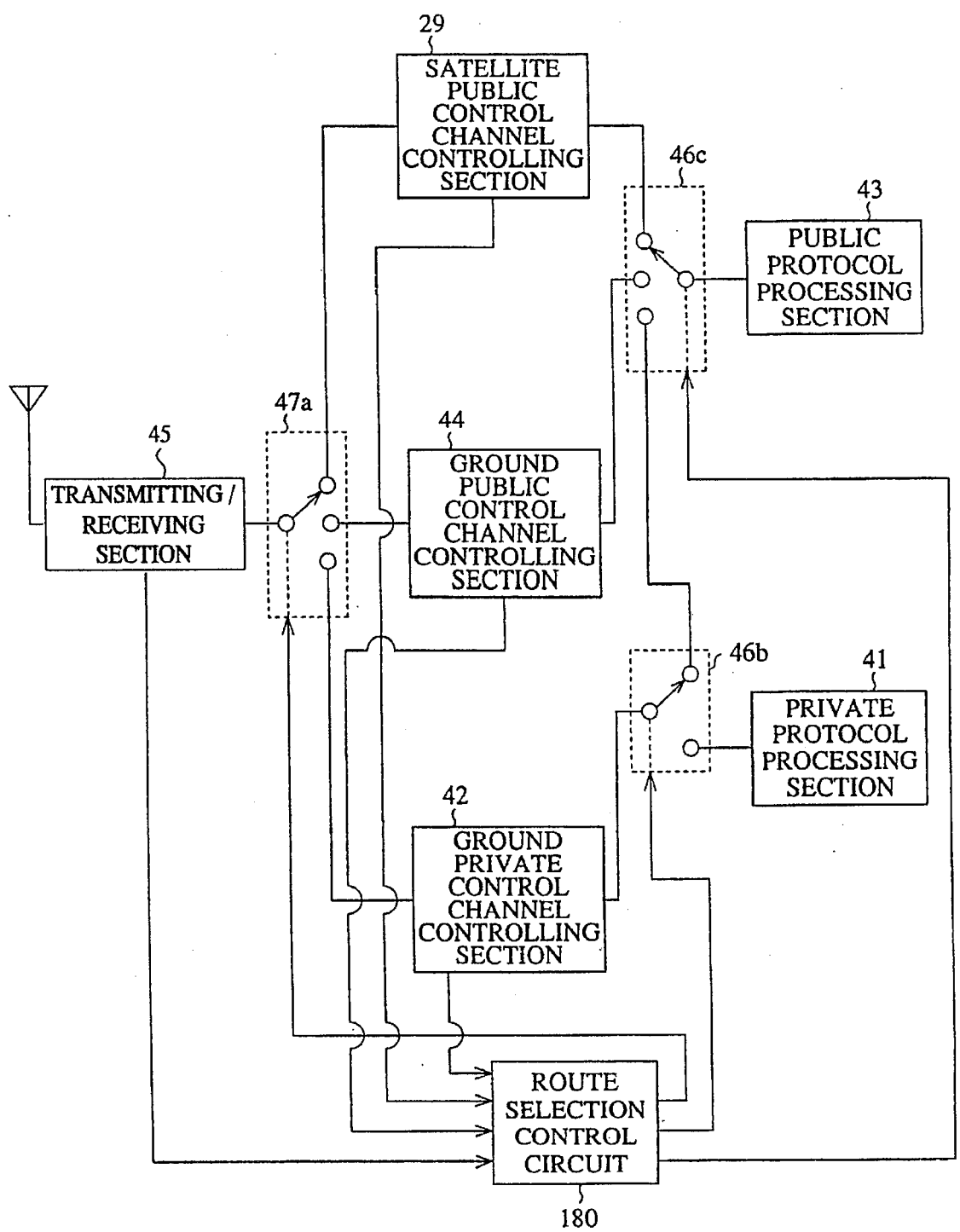
FIG. 10 is a block diagram showing a structure of the mobile telephone.

FIG. 10 is a block diagram showing a structure of the mobile telephone 5A.

Figure 4:
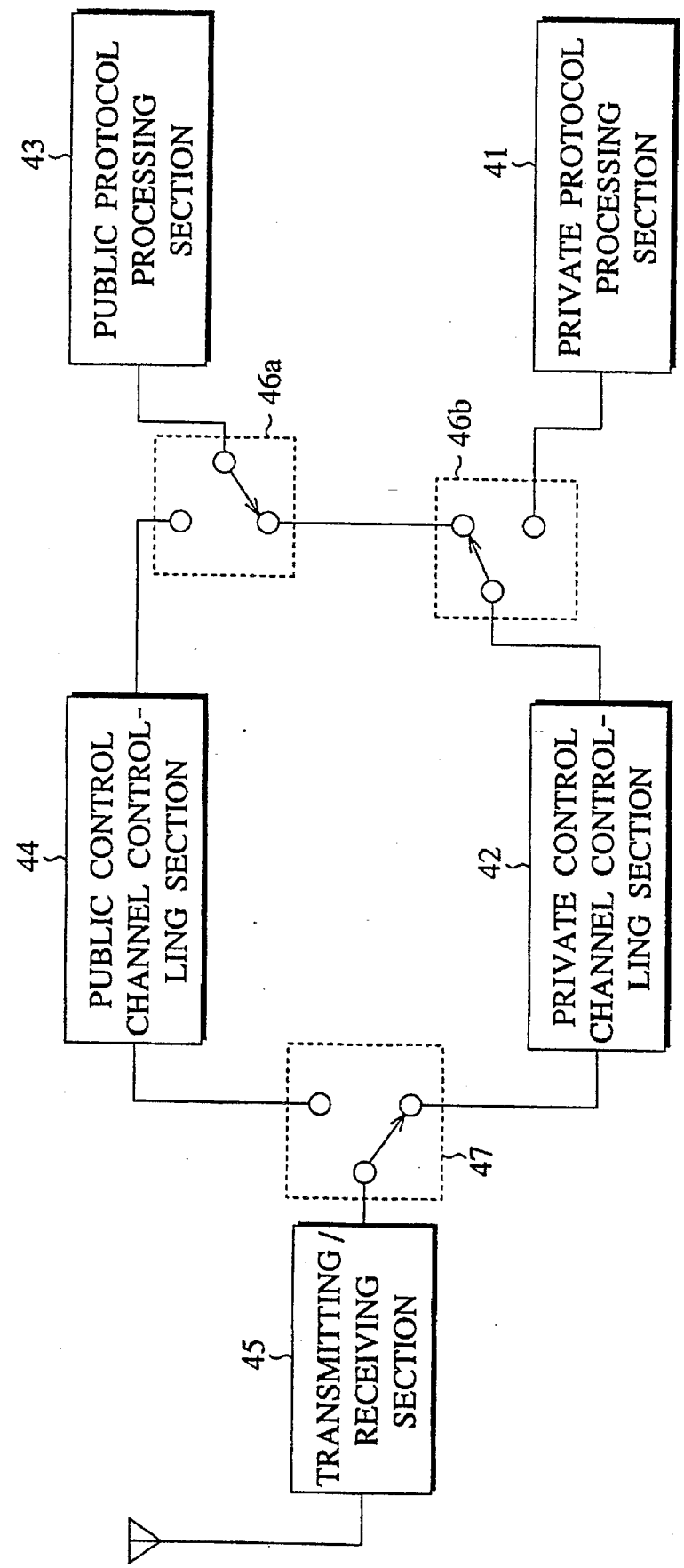
FIG. 4 is a functional block diagram showing a structure of a mobile telephone used in another mobile communication system.

In FIG. 10, the same reference numerals are attached to the same or similar elements as those of FIG. 4 and duplicate explanations are omitted. In this figure, reference numeral 29 denotes a satellite public control channel controlling section, reference numeral 47a denotes a change-over switch for selecting one of the satellite public control channel controlling section 29, the ground public control channel controlling section 44 and the ground private control channel controlling section 42, reference numerals 46b and 46c denote a change-over switch for selecting one of the private protocol processing section 41 and the public protocol processing section 43, reference numeral 180 denotes a route selection control circuit which selects a communication route and controls the switches 46b, 46c and 47a.

Figure 11:
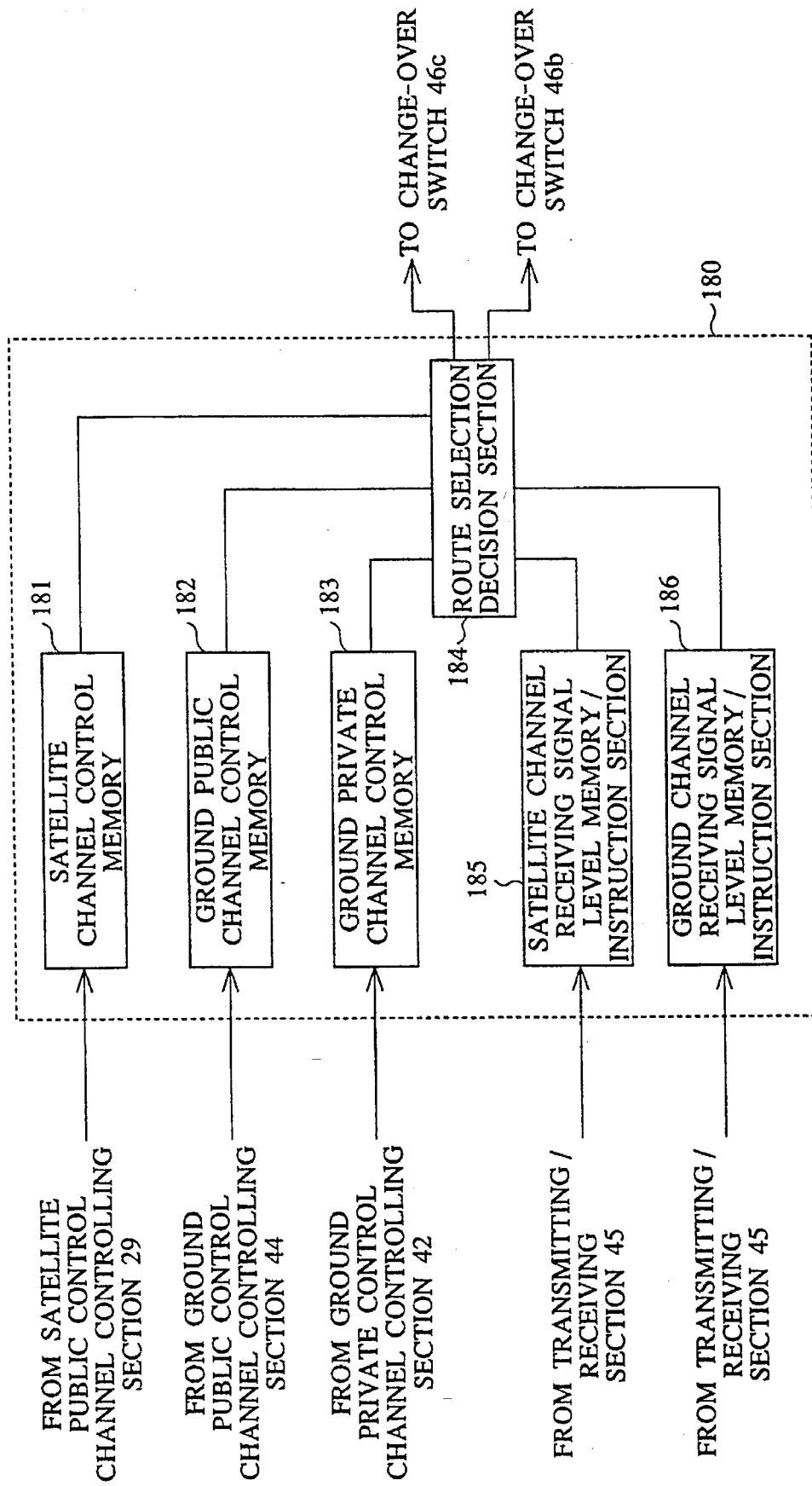
FIG. 11 is a block diagram showing the structure of route selection control circuit.

FIG. 11 is a block diagram showing the structure of route selection control circuit 180.

In this figure, reference numeral 181 denotes a satellite channel control memory, reference numeral 182 denotes a ground public channel control memory, reference numeral 183 denotes a ground private channel memory, reference numeral 184 denotes a route selection decision section, reference numeral 185 denotes a satellite channel receiving signal level memory/instruction section, reference numeral 186 denotes a ground channel receiving signal level memory/instruction section.

Figure 12:
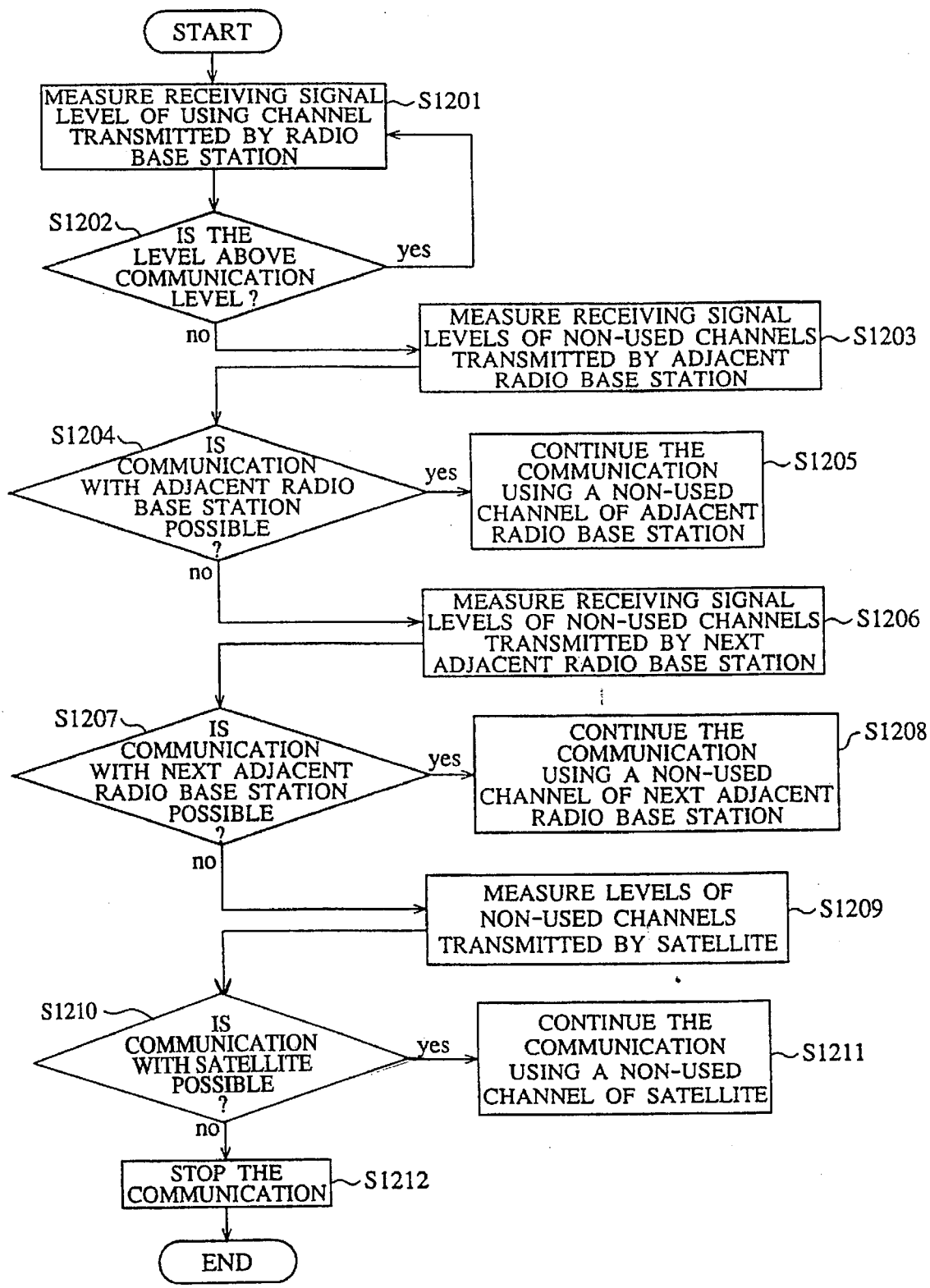
FIG. 12 is a flowchart of deciding route selection performed by the route selection decision section.

FIG. 12 is a flowchart of deciding route selection performed by the route selection decision section 184.

Figure 13:
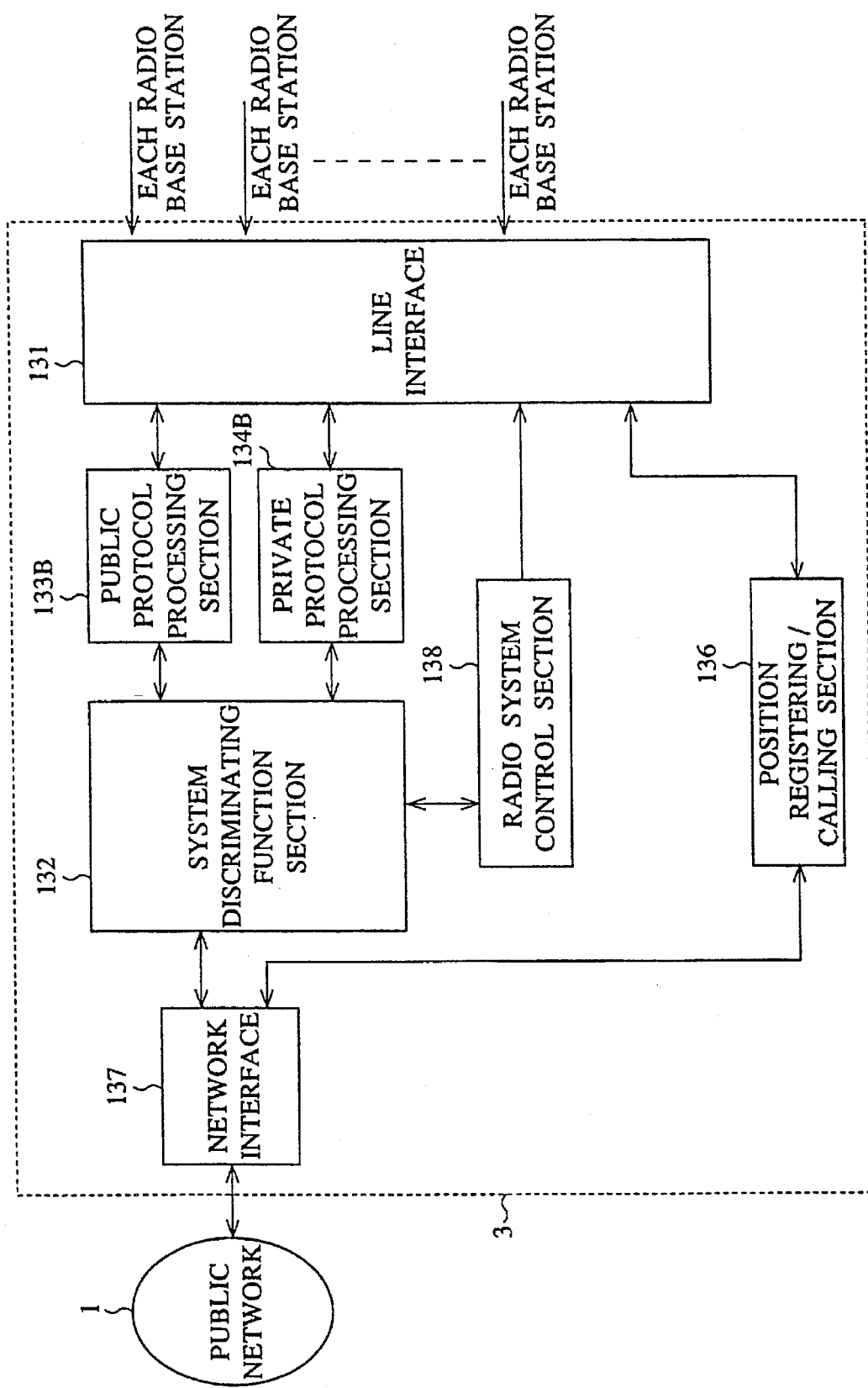
FIG. 13 is a block diagram showing the structure of PBX.

FIG. 13 is a block diagram showing the structure of PBX 3.

In this figure, reference numeral 132 denotes a system discriminating function section, reference numeral 136 denotes a position registering/calling section, reference numeral 138 denotes a radio system control section, reference numeral 137 denotes a network interface, reference numeral 131 denotes a line interface, reference numeral 133B denotes a public protocol processing section, 134B denotes a private protocol processing section.

In the position registering/calling section 136, stored is a list of each radio base station, mobile telephones, and their telephone numbers, with which each radio base station judges to be able to communicate in a table form. Each mobile telephone informs radio base stations of the present position of the mobile telephone by transmitting a radio wave once in every predetermined time period. Each radio base station recognizes mobile telephones the radio base station is able to access and informs the PBX 3 of information about the mobile telephones which the radio station recognizes. Upon receiving this information, the PBX 3 stores a list of radio base stations and mobile telephones with which the radio base stations are able to communicate into the position registering/calling section 136 in a form of a table. Further, the position registering/calling section 136 has a function to call out for mobile telephones which exist in the private system 2 and a function to respond to the public network 1 when the public network 1 inquires whether a specific mobile telephone exists in the private system 2 or not.

Figure 14:
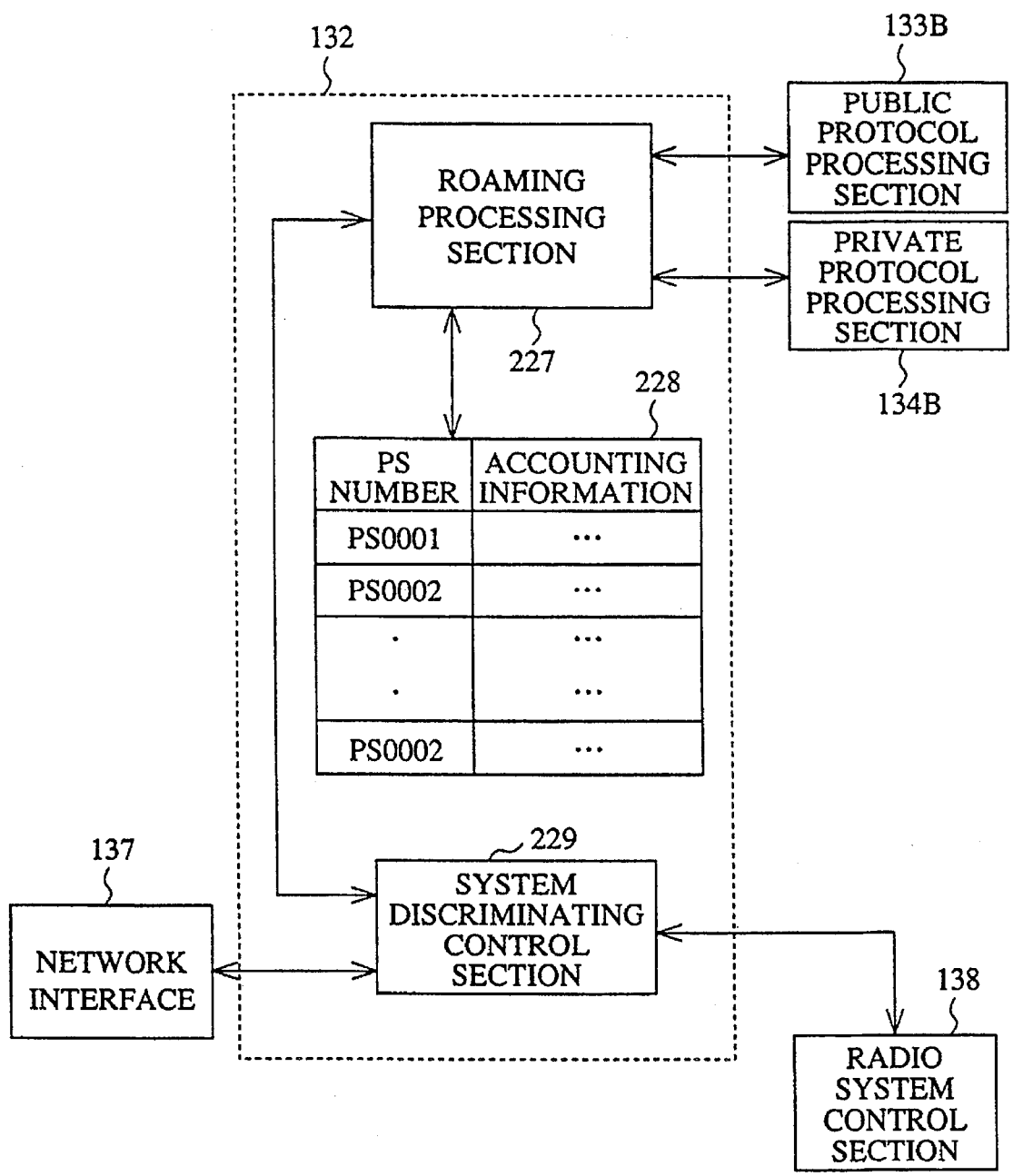
FIG. 14 is a block diagram showing the detailed structure of system discriminating function section of PBX.

FIG. 14 is a block diagram showing the detailed structure of system discriminating function section 132 of PBX 3.

In this figure, reference numeral 227 denotes a roaming processing section, reference numeral 228 denotes a memory in which numbers inherent to mobile telephones (PS) and corresponding accounting information are stored, reference numeral 229 denotes a system discriminating control section. The roaming processing section 227 performs roaming processing and transfer of accounting information for the satellite station.

Figure 15:
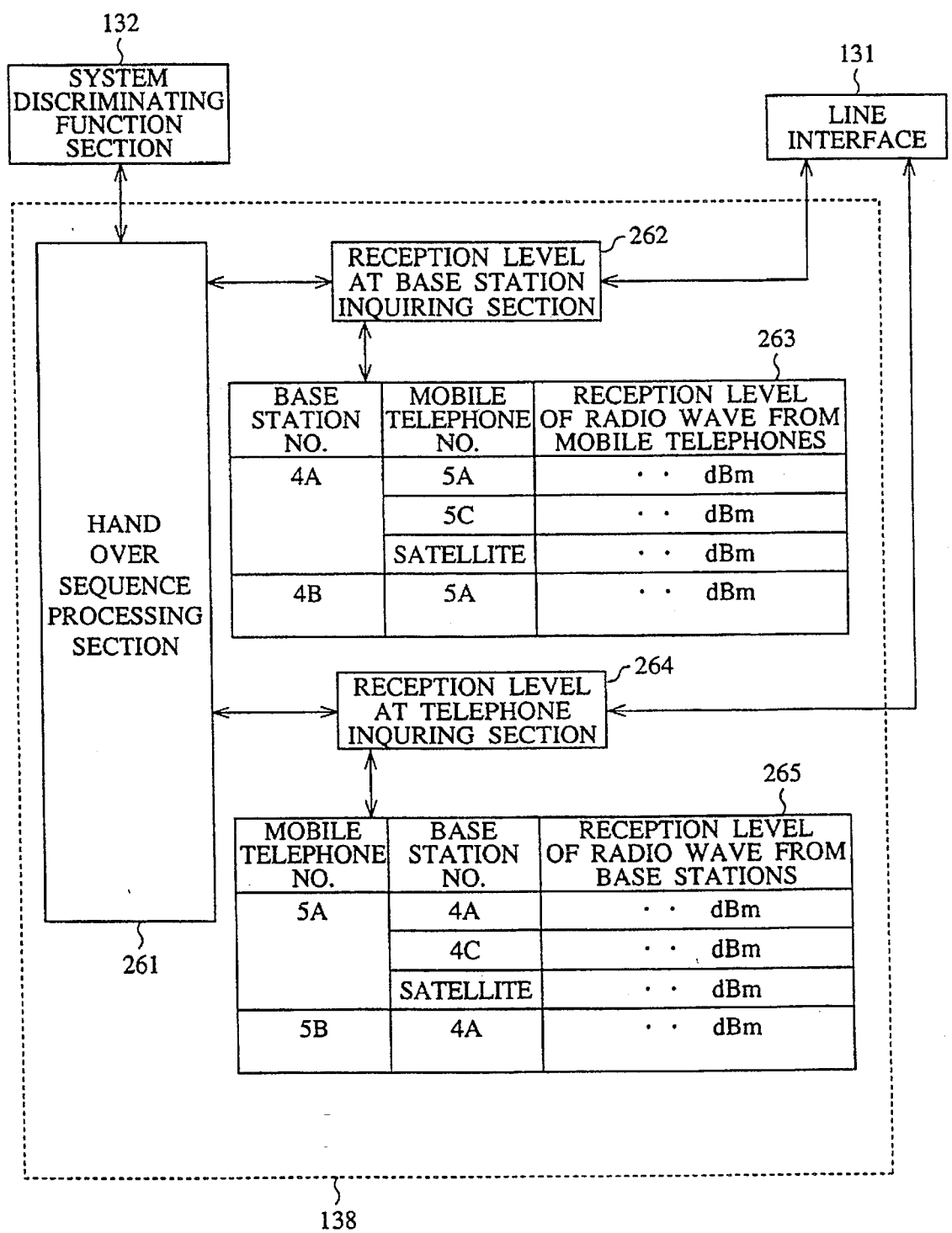
FIG. 15 is a block diagram showing a detailed structure of the radio system control section of PBX.

FIG. 15 is a block diagram showing a detailed structure of the radio system control section 138 of PBX 3.

In this figure, reference numeral 262 denotes a reception level at base station inquiring section which inquires reception level of radio wave at the base station transmitted from the mobile telephone, reference numeral 263 denotes a reception level information memory for storing reception levels of the radio wave from the mobile telephone, reference numeral 264 denotes a reception level at telephone inquiring section which inquires reception levels of radio wave at mobile telephone transmitted from the radio base stations and the satellite, reference numeral 265 denotes a reception level information memory for storing reception levels of the radio wave from the radio base stations and satellite.

Figure 16:
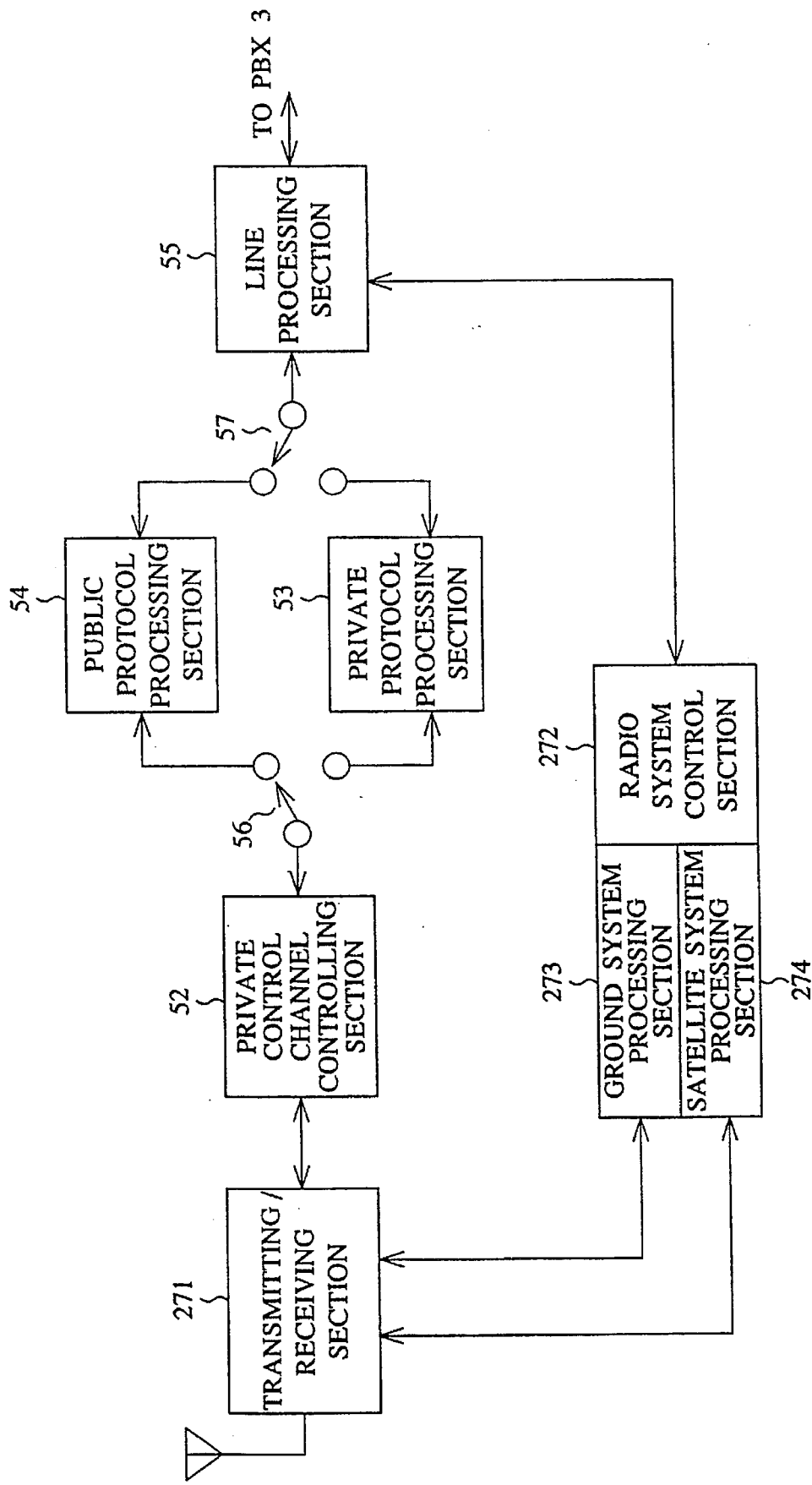
FIG. 16 is a block diagram showing a structure of the radio base station.

FIG. 16 is a block diagram showing a structure of the radio base station.

Figure 5:
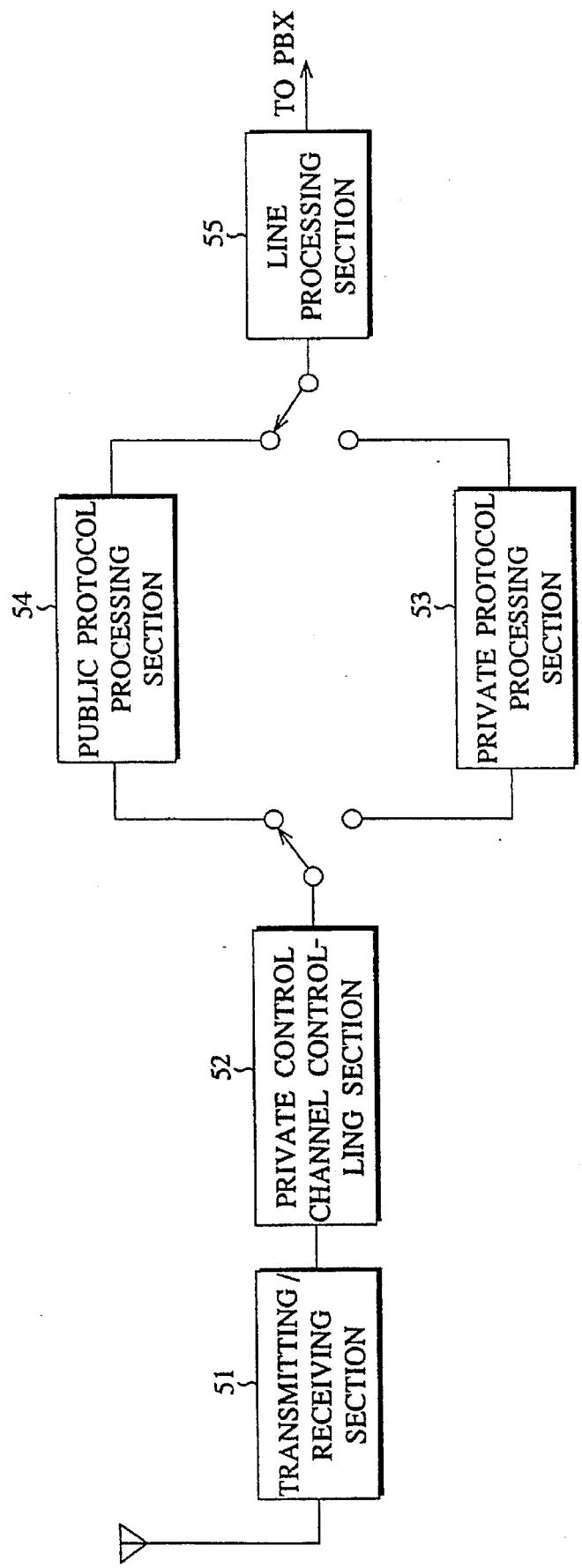
FIG. 5 is a functional block diagram showing a structure of the radio base stations of the private system illustrated in FIG. 2.
Figure 6:
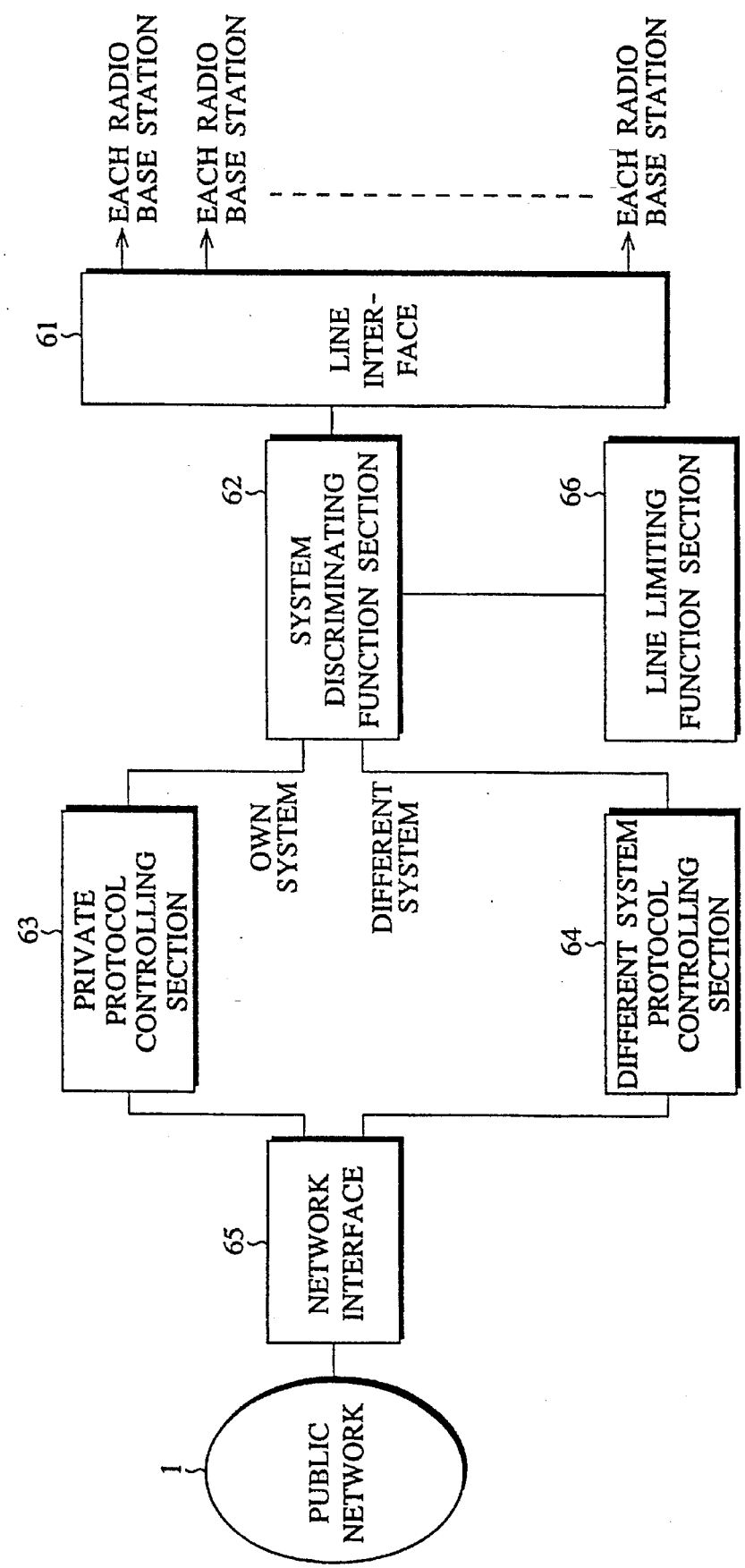
FIG. 6 is a functional block diagram showing a structure of the private branch exchange.
Figure 7:
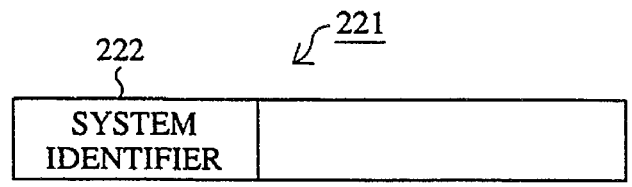
FIG. 7 shows the system identifier of the control information included in the connection request.
Figure 8:
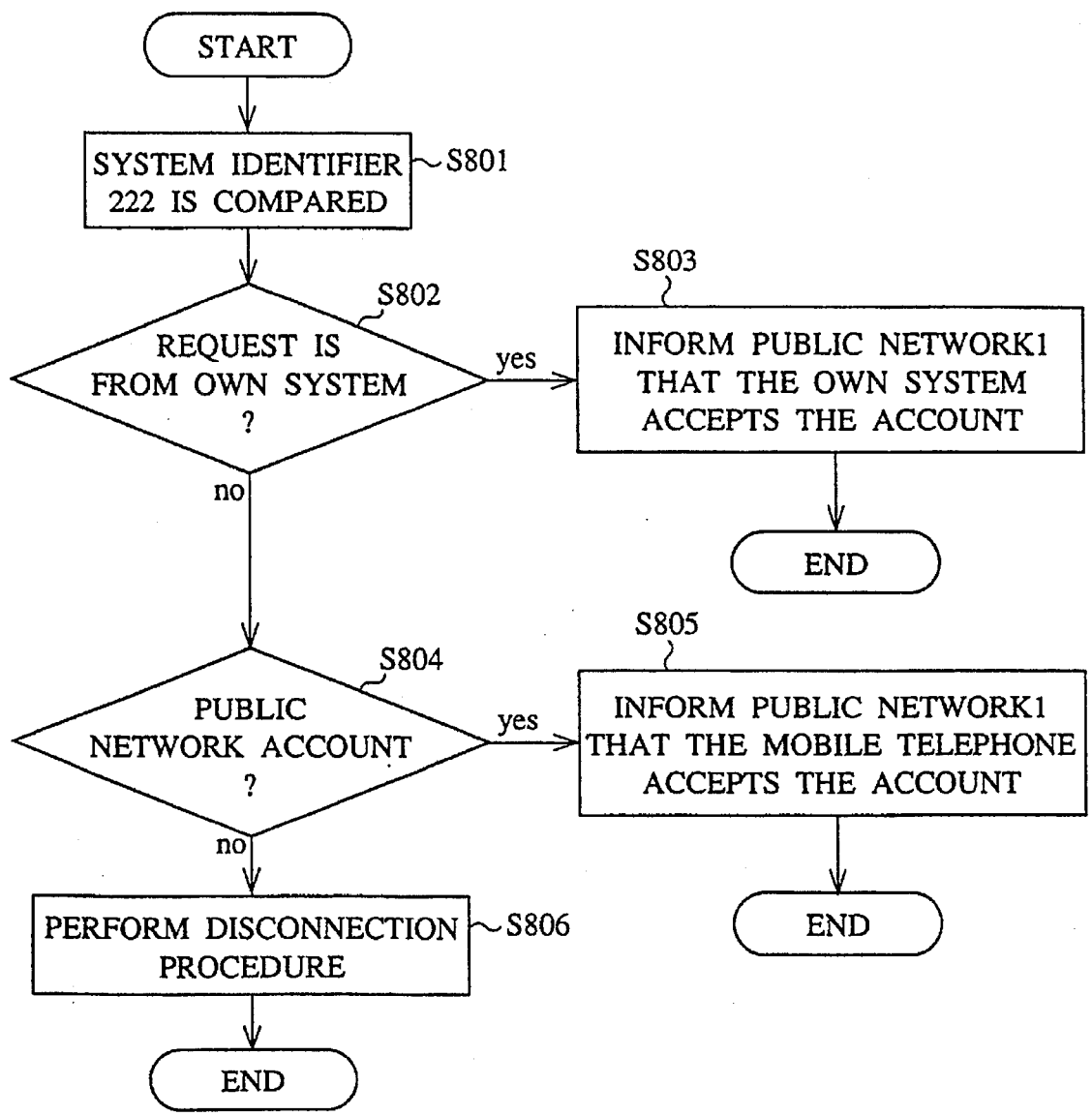
FIG. 8 is a flowchart showing the operation of the system discriminating function section.

In this figure, the same reference numerals are attached to the same or similar elements as those of FIG. 5 and duplicate explanations are omitted. In FIG. 16, reference numeral 271 denotes a transmitting/receiving section, reference numeral 272 denotes a radio system control section, reference numeral 273 denotes a ground system processing section, reference numeral 274 denotes a satellite system processing section.

Figure 17:
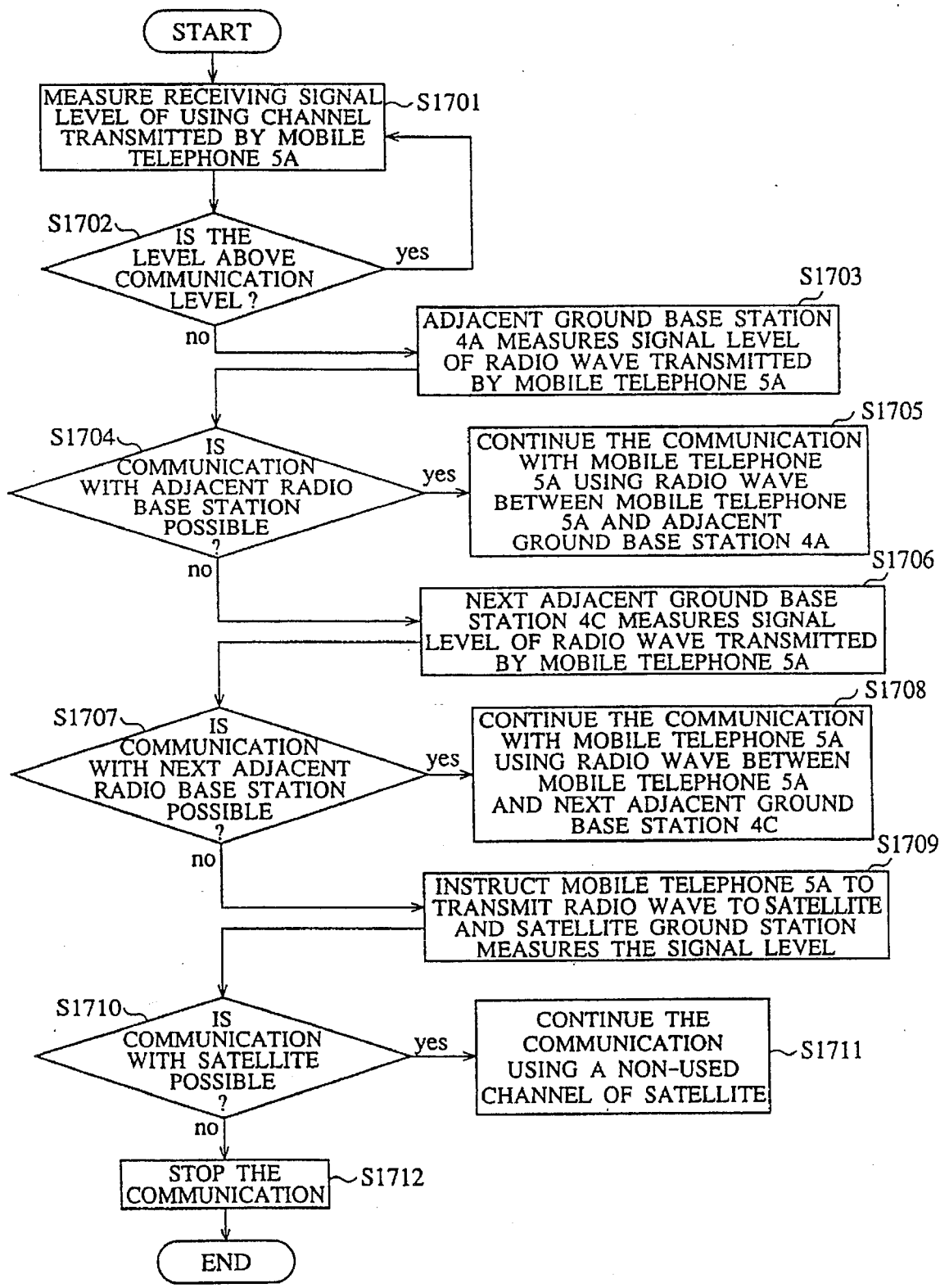
FIG. 17 is a flowchart showing the operation of the radio base stations and PBX when roaming is carried out.
Figure 19:
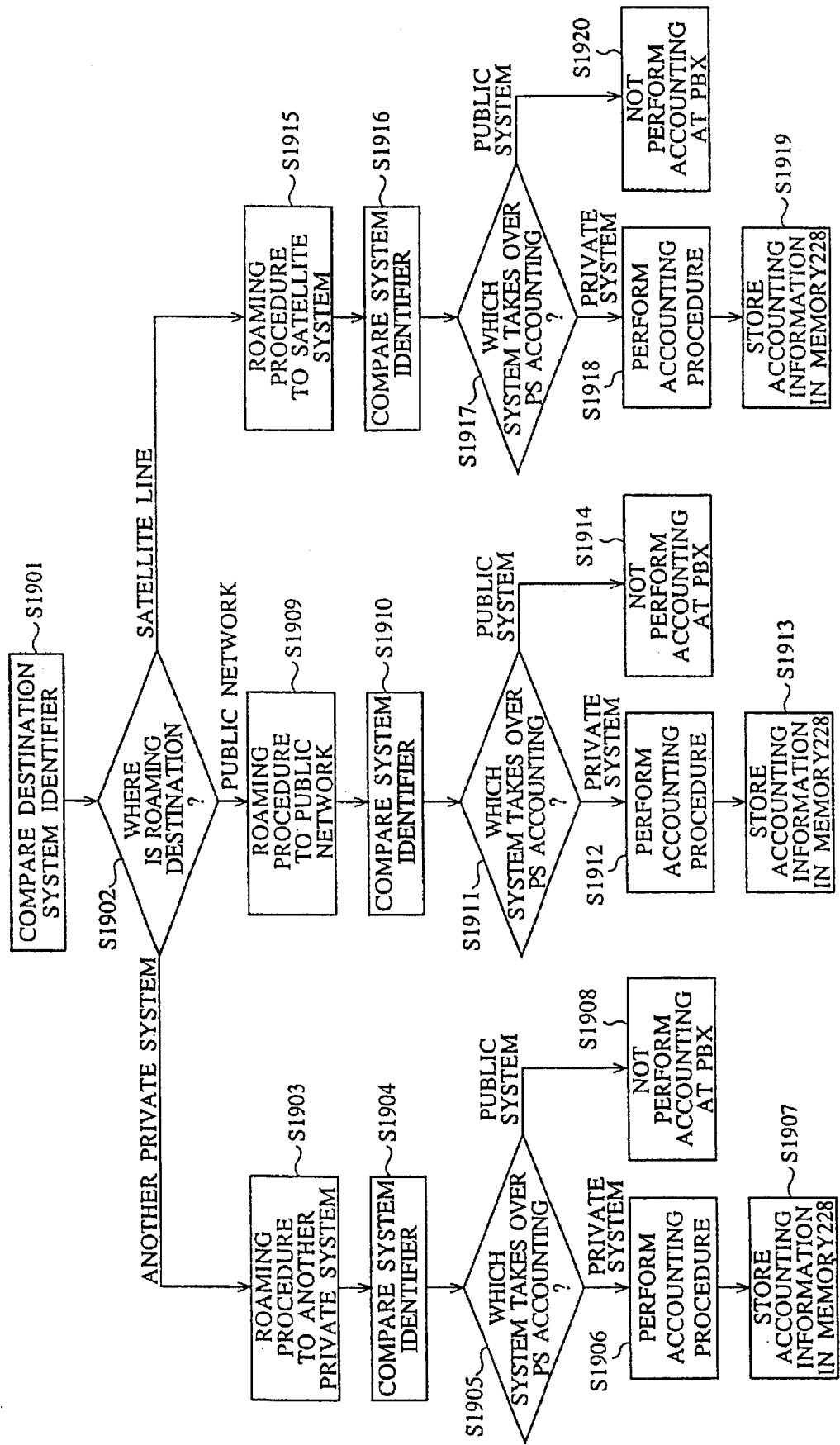
FIG. 19 is a flowchart showing the operation of PBX when roaming is carried out.

FIG. 12 is a flowchart showing the operation of the route selection of the mobile telephone 5A when it receives an instruction to measure receiving signal levels from the PBX 3. FIG. 17 is a flowchart showing the operation of the radio base stations and PBX 3 when roaming is carried out. FIG. 19 is a flowchart showing the operation of PBX 3 when roaming is carried out.

The case will be explained where the mobile telephone 5A belonging to the private system moves outside the zone of the private system and the mobile telephone is connected with satellite communication line.

Figure 20:
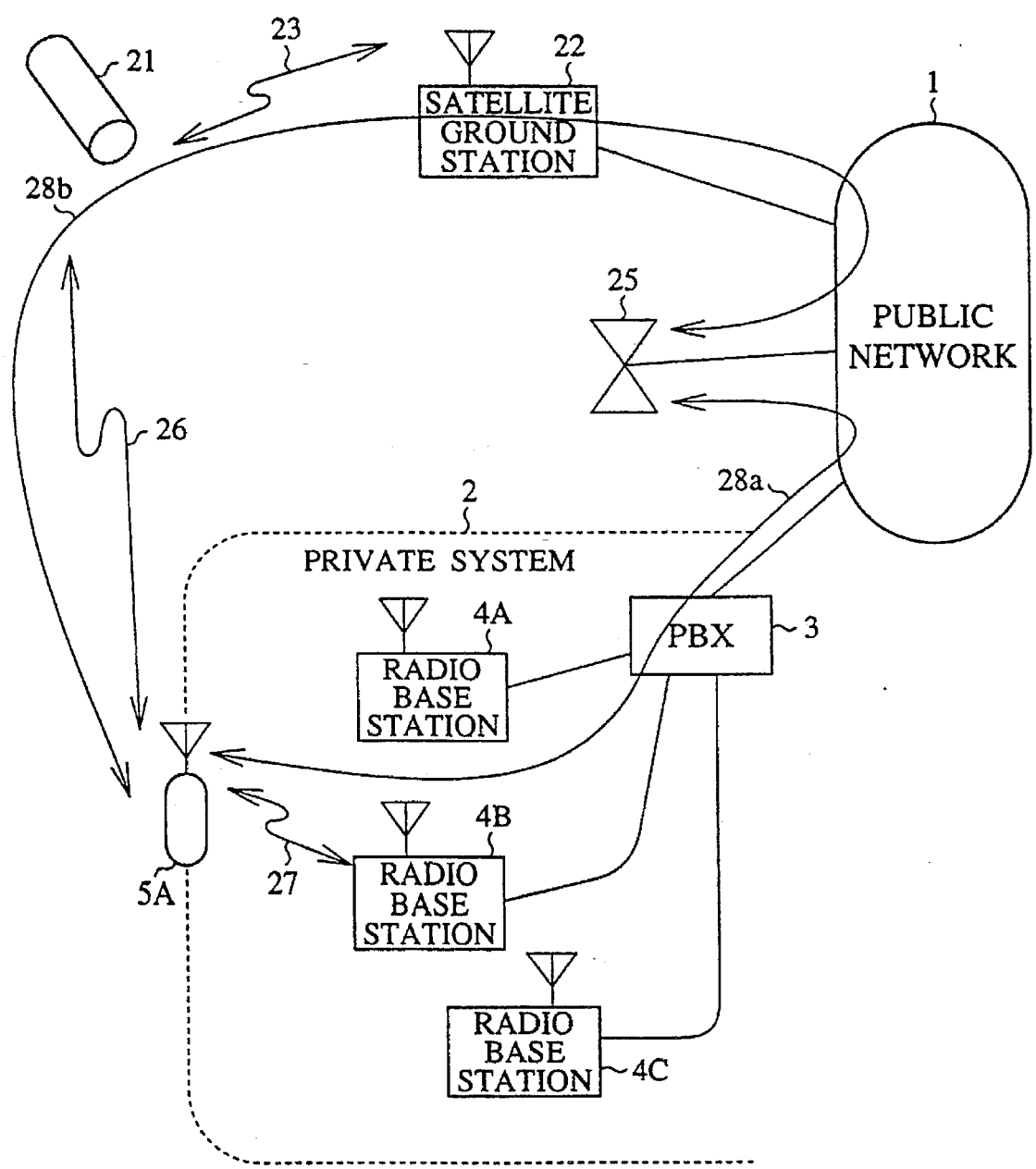
FIG. 20 is a schematic drawing for explaining the case where mobile telephone 5A moves to the outside of zone of the private system while keeping a communication with a subscriber's telephone which is connected to the public network.

FIG. 20 is a schematic drawing for explaining the case where mobile telephone 5A moves to the outside of zone of the private system while keeping a communication with subscriber's telephone 25 which is connected to the public network.

Figure 21:
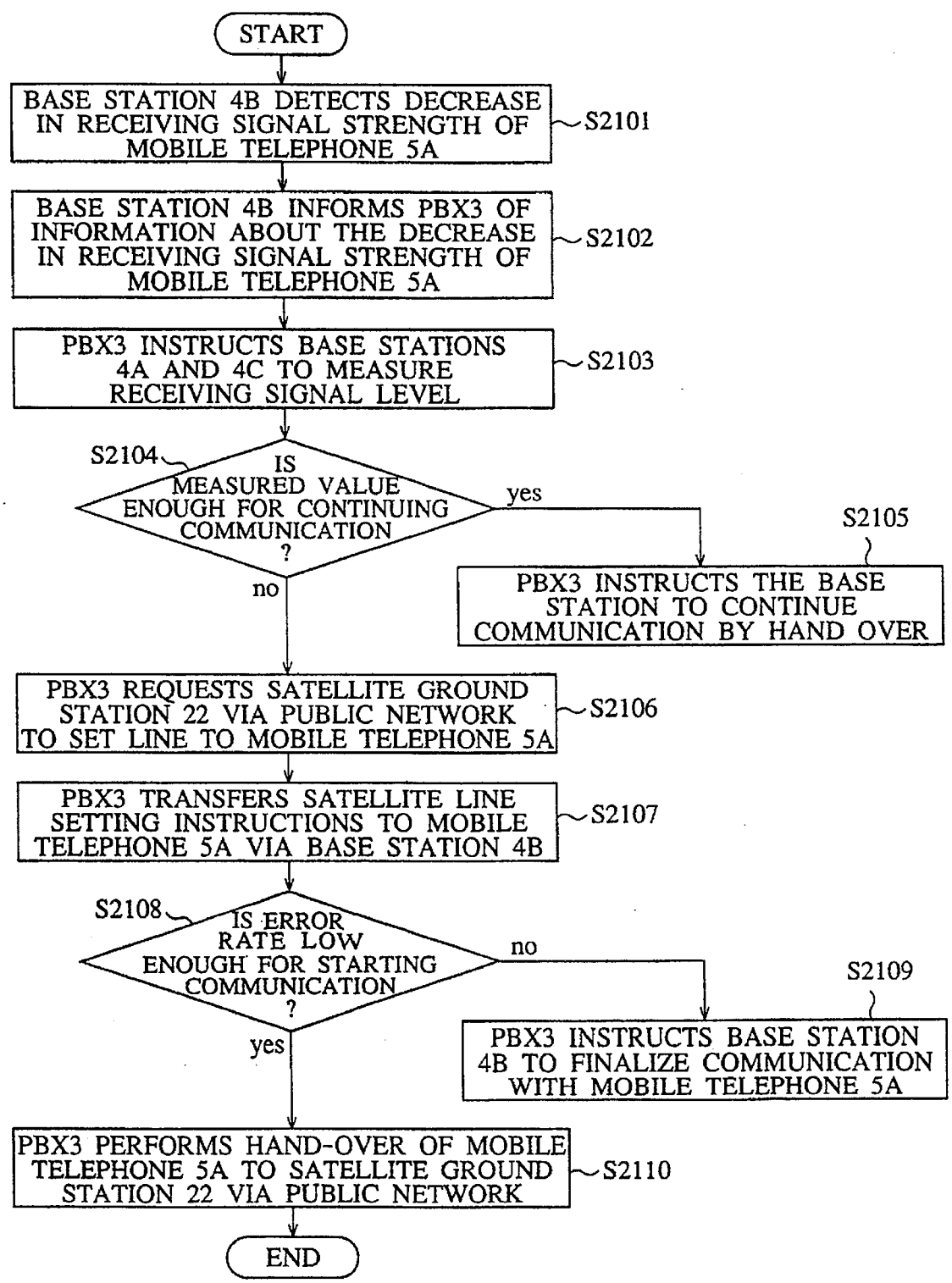
FIG. 21 is a flowchart showing a hand-over sequence among the mobile telephone, the radio base station and the PBX.

FIG. 21 is a flowchart showing a hand-over sequence among the mobile telephone 5A, the radio base station 4C and the PBX 3. In FIG. 20, when the mobile telephone 5A begins to go out of the communication zone of radio base station 4B, the radio base station 4B detects a decrease in receiving signal strength at step S2101 and reports the receiving signal strength to the PBX 3 at step S2102. Upon receiving the signal strength report, the PBX 3 instructs the base stations 4A and 4C which are situated in the vicinity of the base station 4B to measure signal strength of the mobile telephone 5A at step S2103. Based on the signal strengths measured by the base stations 4A and 4C, the PBX 3 makes a decision whether the communication should continue through the private system 2 or not at step S2104. When the signal from the mobile telephone 5A is strong enough for a communication within the private system 2, the communication continues within the private system 2 by hand over at step S2105. On the other hand, when the signal from the mobile telephone 5A is not strong enough, i.e., below a predetermined level, the PBX 3 requests the satellite ground station 22 via public network 1 to set a line to the mobile telephone 5A at step S2106.

Figure 22:
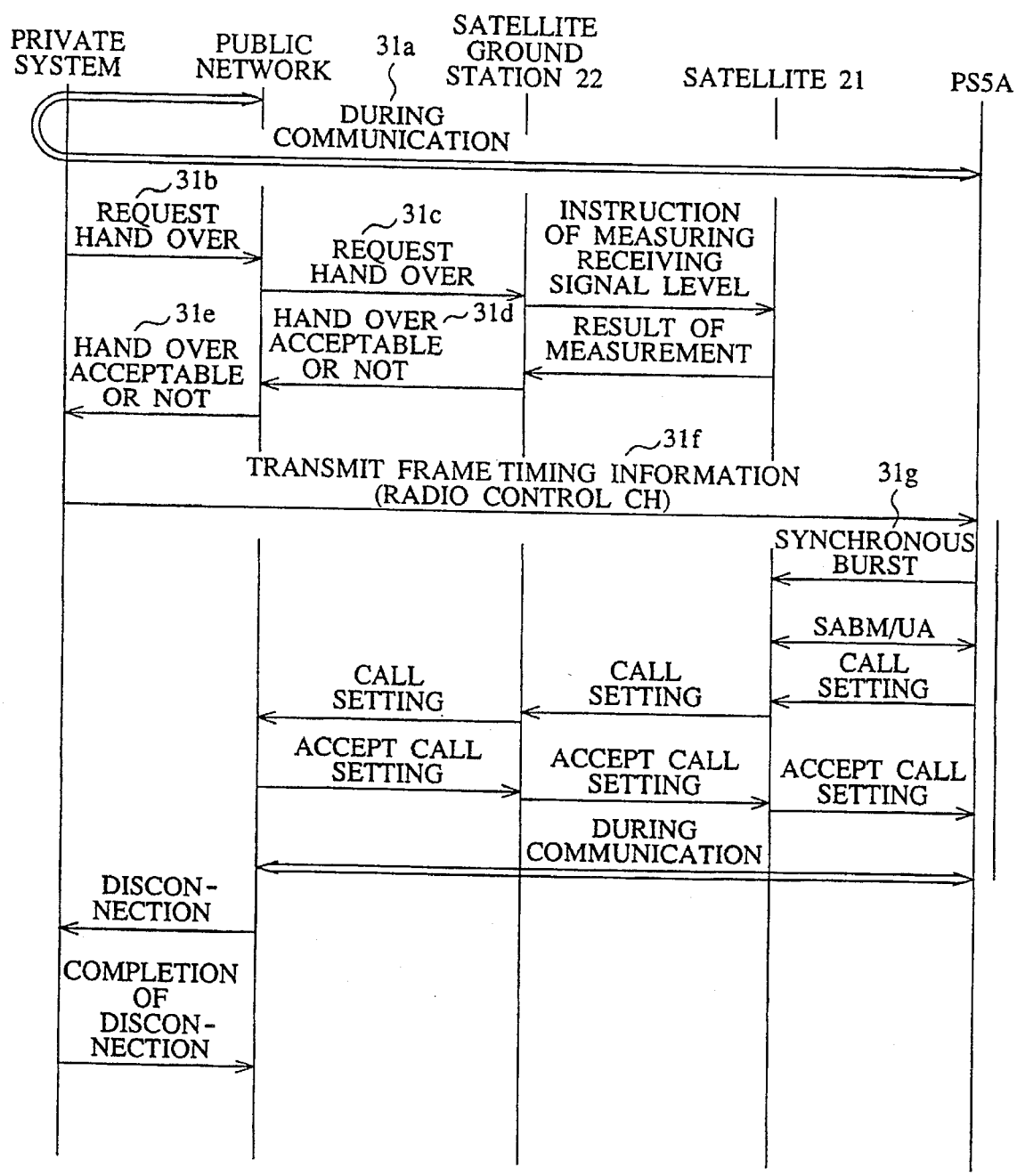
FIG. 22 is a sequence diagram showing a sequence of the protocol corresponding to the flowchart of FIG. 21.

FIG. 22 is a sequence diagram showing a sequence of the protocol corresponding to the flowchart of FIG. 21. Step S2106 of FIG. 21 indicates a start of hand-over to the satellite system and this step corresponds to hand-over request 31b of FIG. 22. Next, the PBX 3 instructs satellite ground station 22 to measure strength of the radio wave signal transmitted by the mobile telephone 5A for the satellite line. At step S2107, when the signal is strong enough for starting a hand-over communication, the satellite ground station 22 informs the PBX 3 via public network 1 of the acceptability of hand-over.

When the PBX 3 receives the acceptability of hand-over, the hand-over for the mobile telephone 5A is performed and communication route is changed from the route 28a to the route 28b at step S2109 of FIG. 21, which corresponds to 31f of FIG. 22. In this case, the mobile telephone 5A belongs to the private system 2 and the protocol of the mobile telephone 5A is processed at the private protocol processing section 41 and protocol data are outputted to the transmitting/receiving section 45 via the switch 46b, ground private control channel controlling section 42, switch 47a. On the other hand, when the mobile telephone 5A is connected to satellite line, the protocol of the mobile telephone 5A is processed at the public protocol processing section 43 and the protocol data are outputted to the transmitting/receiving section 45 via the switch 46c, the satellite public control channel controlling section 29 and the switch 47a.

In the mobile communication system of FIG. 20, the mobile telephone 5A roams while making communication with the subscriber's telephone 25 and the mobile telephone 5A belongs to the private system 2. Therefore, when the hand-over is carried out, either the system 2 or mobile telephone 5A itself takes over accounting. Whether the system 2 takes over accounting or the mobile telephone 5A takes over accounting is determined based on the protocol information of FIG. 23.

In FIG. 21, if the mobile telephone 5A does not belong to the private system 2, the item 32f "D. WHETHER THE MOBILE TELEPHONE ACCEPTS ACCOUNTING OR NOT" of hand-over request 32a in the protocol information list for roaming indicates acceptance of accounting. In this case, for the communication with the private system 2, the public protocol processing section 43 is connected to the ground private control channel controlling section 42 by the switches 46b and 46c drawn in FIG. 10 and the ground private control channel controlling section 42 is connected to the transmitting/receiving section 45 by the switch 47a. Protocol data precessed in the public protocol processing section 43 are transmitted on a private channel. After that, for the communication with the satellite 21, public protocol processing section 43 is connected to the satellite public control channel controlling section 29 by the switch 46c and satellite public control channel controlling section 29 is connected to the transmitting/receiving section 45 by the switch 47a. Protocol data processed in the public protocol processing section 43 is transmitted on a satellite channel.

Next, the operation of the route selection control circuit 180 of the mobile telephone 5A will be described in detail referring to the flowchart of FIG. 12.

The mobile telephone 5A always observes the transmission signal from the radio base station 4B while continuing a communication with the radio base station 4B via the radio path 27. According to the instruction from the radio base station, the route selection decision section 184 instructs the ground channel receiving signal level memory instruction section 186 to measure the receiving signal level at the transmitting/receiving section 45 and the round channel receiving signal level memory/instruction section 186 stores the result of the measurement.

When the measured level is below the communication continuable level at step S1202, the route selection decision section 184 decides to measure the transmitting signal level of the adjacent ground base station at step S1203. Namely, Measurement of the signal from adjacent base station is instructed by ground channel receiving signal level memory/ instruction section 186.

When the mobile telephone 5A is able to communicate with at least one of the radio base stations at step S 1204 or S1207, the communication is continued on a non-used channel at step S1205 or S1208. The switch 46b is fixed on the side of private protocol processing section 41 and continuity of communication is confirmed referring to the ground private channel control memory section 183.

When the mobile telephone 5A is not able to communicate with the adjacent base station or the next adjacent base station at steps S1204 and S1207, receiving signal level of the radio wave from the satellite is measured. Namely, instruction information for measuring levels is sent to the satellite channel receiving signal level memory/instruction section 185 and satellite signal level is measured in the transmitting/receiving section 45 at step S1209.

When the measured value is above the communication continuable level at step S1210, the communication is continued by turning the switches 47a, 46c to the satellite public control channel controlling section 29. At the same time, referring to the satellite public channel control memory 181, the continuity of communication is observed.

The system discriminating function section 132 of the PBX 3 in FIG. 13 is constituted of the roaming processing section 227, the mobile telephone PS accounting information memory section 228 and system discriminating control section 229 as shown in FIG. 14.

Figure 18:
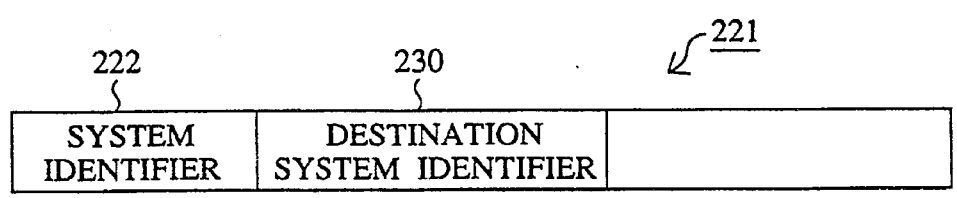
FIG. 18 is an illustration of control information.

The roaming processing section 227 performs roaming processing and accounting processing for a corresponding line by analyzing the system identifier 222 and the destination identifier 230 of the control information 221 which is sent from the mobile telephone 5A and which is illustrated in FIG. 18 according to the flowchart of FIG. 19.

Firstly, the destination system identifier is compared at step S1901. According to this identifier 230, destination of roaming is recognized. At step S1901, when a roaming destination is not recognized, communication is disconnected. When a roaming destination is another private system, roaming process to this private system is performed at step S1903. Next, the system identifier 222 is compared at step S1904 and it is recognized which system takes on the accounting procedure. When the private system 2 takes on the accounting procedure at step S1905, the PBX 3 performs the accounting procedure at step S1906 and the accounting information is stored in the mobile telephone accounting information memory 228 at step S1907. On the other hand, the public system 1 takes on the accounting procedure, the PBX 3 does not perform accounting procedure at step S1908 and public network 1 performs this accounting procedure.

On the other hand, when the roaming destination is the public network 1, roaming process to public network 1 is performed at step S1909. Next, the system identifier 222 is compared at step S1910 and it is recognized which system takes on the accounting procedure. When the private system 2 takes on the accounting procedure at step S1911, the PBX 3 performs the accounting procedure at step S1912 and the accounting information is stored in the mobile telephone accounting information memory 228 at step S1913. On the other hand, when the public system 1 takes on the accounting procedure at step S1911, the PBX 3 does not perform accounting procedure at step S1914 and public network 1 performs accounting procedure.

On the other hand, when the roaming destination is the satellite line, roaming process to the satellite line is performed at step S1915. Next, the system identifier 222 is compared at step S1916 and it is recognized which system takes on the accounting procedure. When the private system 2 takes on the accounting procedure at step S1916, the PBX 3 performs the accounting procedure at step S1918 and the accounting information is stored in the mobile telephone accounting information memory 228 at step S1919. On the other hand, when the public system 1 takes on the accounting procedure, the PBX 3 does not perform accounting procedure at step S1920 and public network 1 performs accounting procedure.

In each case described above, the speech communication does not go through the PBX 3 after the roaming process is performed.

The operation of the hand over sequence processing section 261 in radio system control section of the PBX 3 will be explained in detail referring to the flowchart of FIG. 17.

When the mobile telephone 5A gradually moves away from the radio base station 4B and radio base station 4B detects a decrease in strength of signal from the mobile telephone 5A before the mobile telephone 5A detects a decrease in strength of signal from the radio base station 4B, a hand over sequence is performed according to the flowchart of FIG. 17.

In the system of FIG. 9, the radio base station 4B observes strength of a transmission signal from the mobile telephone 5A while continuing a communication with the mobile telephone 5A via path 27 at steps S1701 and S1702. According to an instruction of measurement from the PBX 3, the radio system control section 272 of radio base station 4B instructs the transmitting/receiving section 271 via the ground system processing section 273 to measure the strength of the signal from the mobile telephone 5A during communication. The result of measurement is sent to reception level information memory 263 of the PBX 3 via the line processing section 55, the line interface 131 of PBX 3, and reception level at base station inquiring section 262 in FIG. 15. Then, each measured level is stored in the reception level memory 263 in relation to each mobile telephone in a table form.

The reception level at base station inquiring section 262 instructs all the radio base stations which are connected to the PBX 3 to report receiving signal level information of radio waves transmitted from mobile telephones. Therefore, the receiving signal level information of radio waves transmitted from all the mobile telephones and received at the radio base stations is stored in the receiving level information memory 263.

When the measured level is below the communication level at step S1702, the hand-over sequence processing section 261 instructs the adjacent radio base station 4A to measure a signal level of the radio waves transmitted from the mobile telephone 5A at step S1703. That is, the ground system processing section 273 of the radio base station 4A instructs the transmitting/receiving section 271 to measure a receiving signal level of radio waves transmitted from the mobile telephone 5A. At step S1704, when the measured receiving level is enough for a communication, a communication between the adjacent radio base station 4A and the mobile telephone 5A is started and the communication between the radio base station 4B and the mobile telephone 5A is stopped at step S1705. Namely, the switch 46b of the radio base station 4A is fixed to the side of the private protocol processing section 41 and continuity of speech communication is confirmed referring to the ground private channel control memory 183.

On the other hand, when the mobile telephone 5A is not able to communicate with the adjacent radio base stations 4A or 4C, the PBX 3 instructs the mobile telephone 5A to transmit the radio waves for the satellite at step S1709. The satellite ground station 22 receives an instruction to measure receiving signal level of radio waves transmitted from the mobile telephone 5A via the satellite 21 from the hand-over sequence processing section 261 via the system discriminating function control section 229 and the public network 1. The satellite ground station 22 measures receiving signal strength of the radio waves transmitted from the mobile telephone 5A via the satellite. The result information of the measurement is sent to the receiving level information memory 263 via the reception level at base station inquiring section 262 of the PBX 3 and is stored therein. When the measured level is high enough for communication at step S1710, the speech communication is maintained via satellite line. However, if it is not possible to set up a satellite line, the PBX 3 performs procedure for stopping the communication at step S1712.

As described above, in the mobile communication system according to this embodiment, even if the mobile telephone 5A moves out of the coverage of the zones of the public network or the private system, a communication to and from the mobile telephone 5A is maintained.

Figure 24:
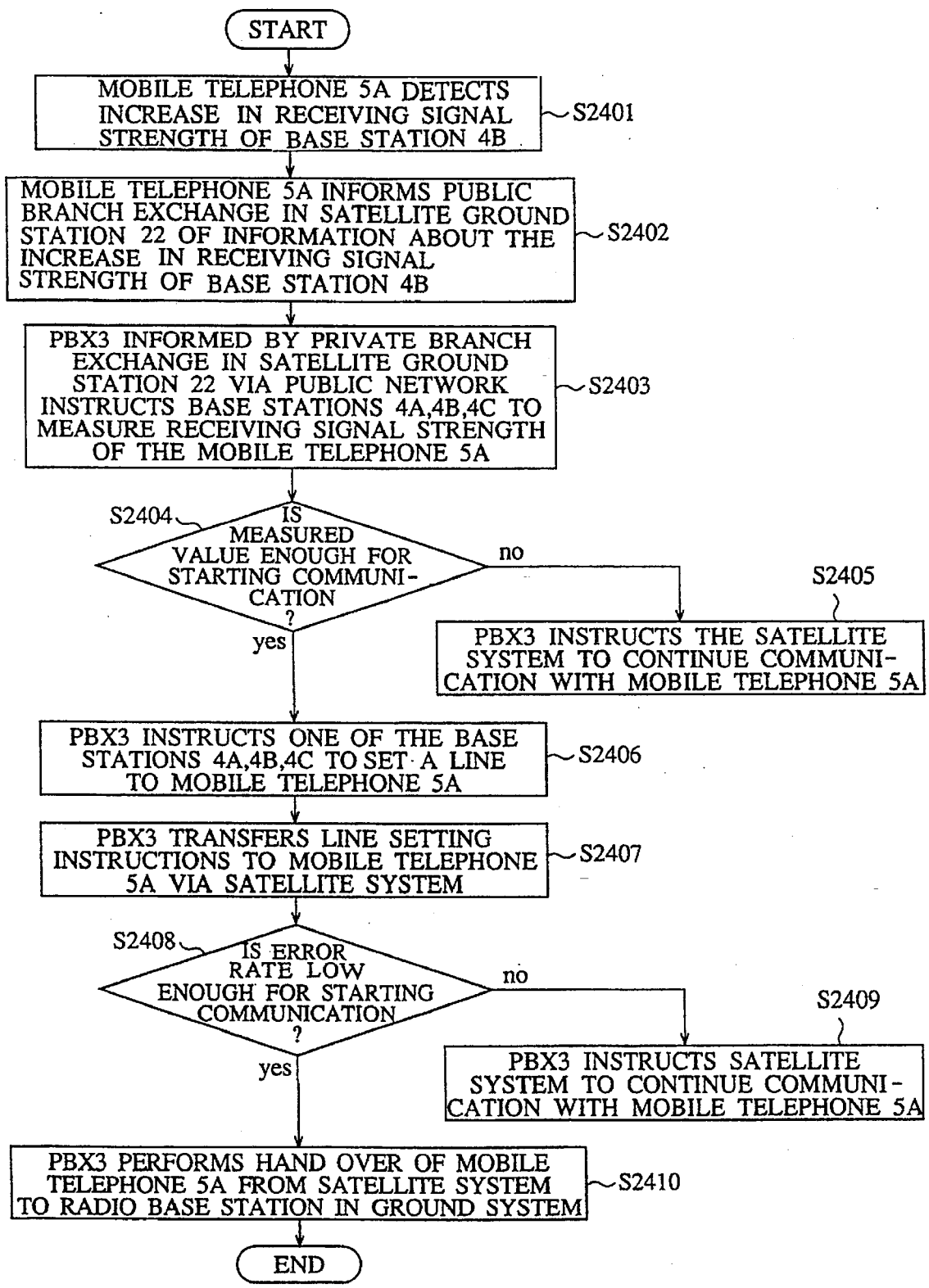
FIG. 24 is a flowchart showing a hand-over in the case where a mobile telephone moves from the outside of the communication zone of the private system into this zone.
Figure 25:
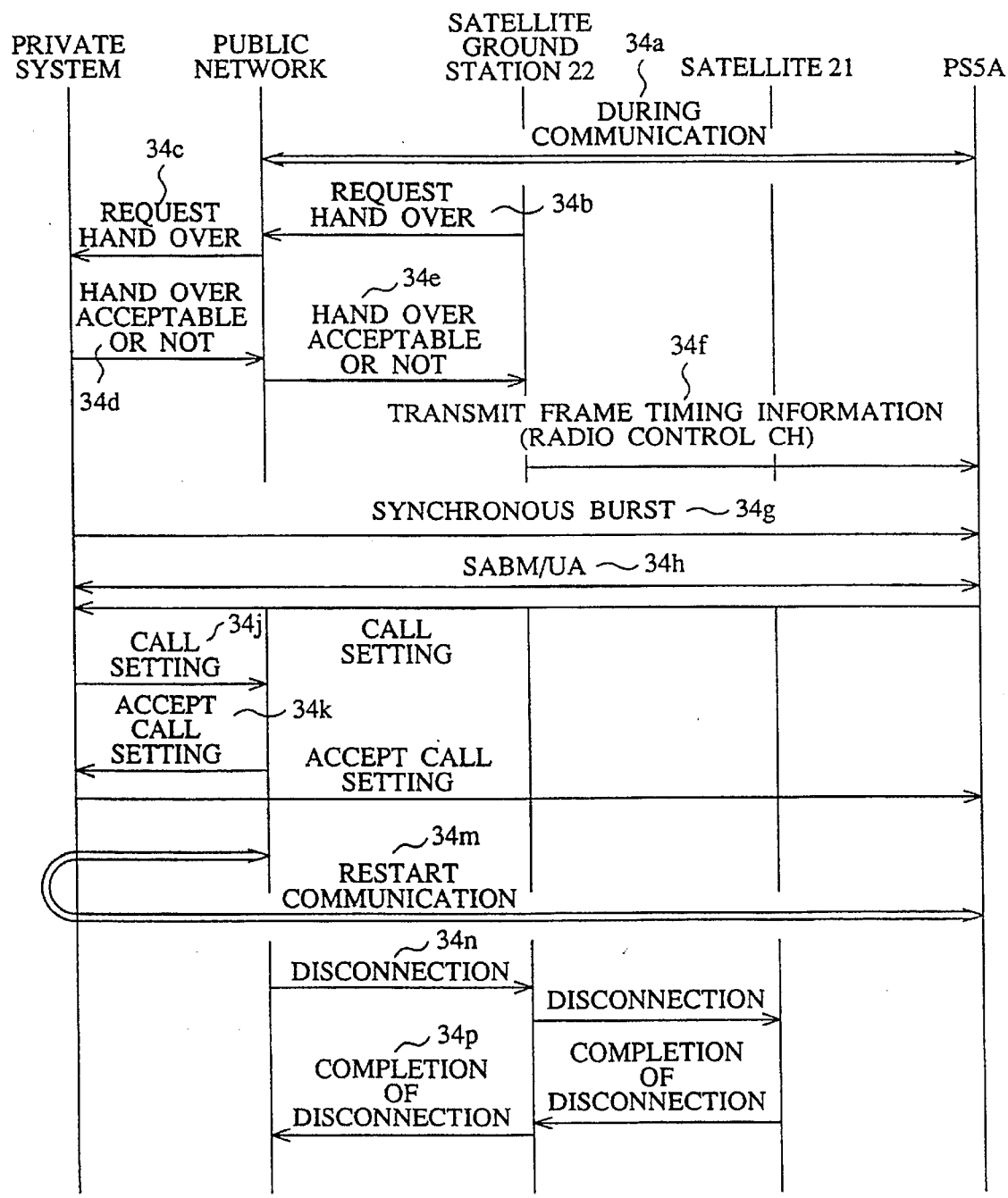
FIG. 25 is a sequence diagram corresponding to the flowchart of FIG. 24.

Next, the case will be explained where a mobile telephone moves from the outside of the communication zone of the private system into this zone. FIG. 24 is a flowchart showing a hand-over in the case where a mobile telephone moves from the satellite system, the outside of the communication zone of the private system, into this zone. FIG. 25 is a sequence diagram corresponding to the flowchart of FIG. 24.

When the mobile telephone 5A of FIG. 9 approaches the private system, the mobile telephone 5A recognizes a control channel of the radio base station 4B of the private system on reception slots and detects increase in receiving signal strength of the radio base station 4B at step S2401. Then, at step S2402, the mobile telephone 5A informs satellite ground station 22 of the increase of signal strength of radio waves transmitted from the radio base station 4B. According to the information sent from the exchange station of the satellite ground station 22 via the public network, the PBX 3 instructs the radio base stations 4A, 4B and 4C to measure receiving signal levels of radio waves transmitted from the mobile telephone 5A at step S2403. When the measured receiving signal level is high enough for a communication at step S2404, the PBX 3 instructs one of the radio base stations 4A, 4B and 4C to set up a line for mobile telephone 5A at step S2406.

Next, the PBX 3 of the private system sends, to the mobile telephone 5A via the satellite system, an instruction to set up a line of the private system at step S2407. When the error bit rate on the line between the mobile telephone 5A and the radio base station is low enough at step S2408, the PBX 3 performs a hand-over of the mobile telephone 5A from the satellite system to the private system at step S2410.

In the sequence diagram of FIG. 25, according to steps S2406 and S2407, hand-over request 34b initiates a change of the lines. When the hand-over is acceptable, based on the hand-over acceptable or not information 34e, a connection destination is changed from the satellite ground station 22. That is, in FIG. 20, a communication path is changed from the path 28b to the path 28a which goes through the private system 2.

Further, when the measured receiving signal level is not high enough at step S2404 or when the bit error rate is not low enough at step S2408, PBX 3 instructs the satellite system to continue the communication with the mobile telephone 5A at steps S2405 or S2409.

Next, transfer of accounting information will be described. When roaming takes place, accounting information is transferred between systems. FIG. 26 is a list of protocol information including accounting information in the case of roaming.

In case of roaming, information of items 35c to 35n is transferred between systems when a hand-over is requested or hand-over is accepted. That is, mobile telephone accounting number 35m is included in a hand-over information. Thus, accounting destination can be changed.

A communication between the mobile telephone 5A and subscriber's telephone 25 is explained above. Next, a communication between the mobile telephone 5A and a fixed telephone or the mobile telephone 5B, which belongs to the private system 2.

Figure 27:
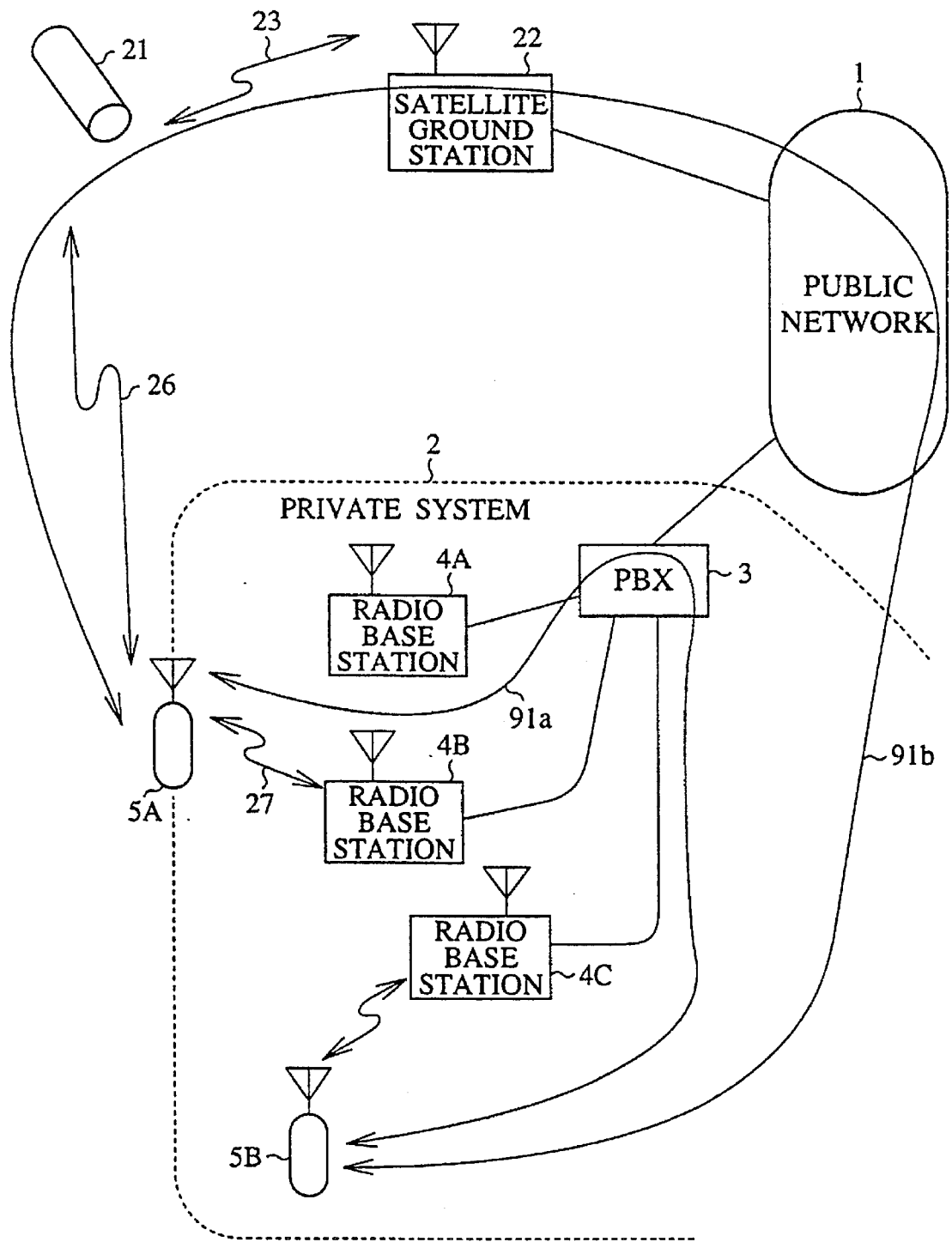
FIG. 27 shows a case where the mobile telephone roams from the private system to the satellite system.
Figure 28:
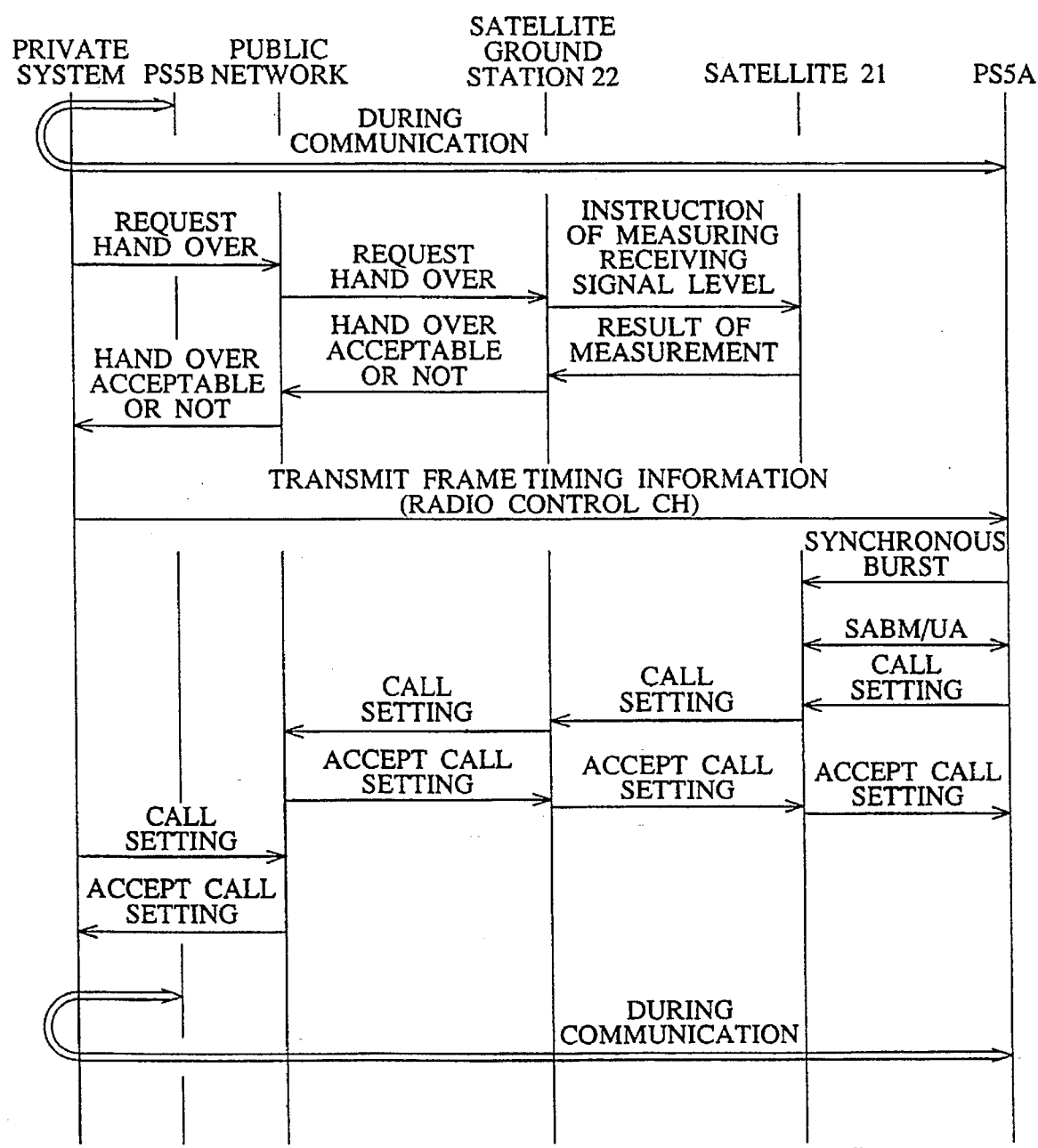
FIG. 28 is a protocol sequence diagram of in the case shown in FIG. 27.

FIG. 27 shows a case where the mobile telephone 5A roams from the private system 2 to the satellite system. FIG. 28 is a protocol sequence diagram of in the case shown in FIG. 27. A description will be made to the case where the mobile telephone 5A begins to perform a hand-over to the satellite system while the mobile telephone 5A is communicating with the mobile telephone 5B connected to the radio base station 4C on the communication path 91a. As shown in FIG. 28, the PBX 3 requests, via the public network 1, the satellite ground station 22 to perform a hand-over. The mobile telephone 5A sets up a line to the exchange station of satellite ground station 22 via the satellite 21 based on the frame timing information for the mobile telephone 5A sent from the radio base station 4B after receiving acceptance of hand-over from the satellite ground station 22. The communication between the mobile telephone 5A and the mobile telephone 5B is started on the communication path 91b after satellite ground station 22 sets up a call to the public network 1 and sets up a satellite line.

Figure 29:
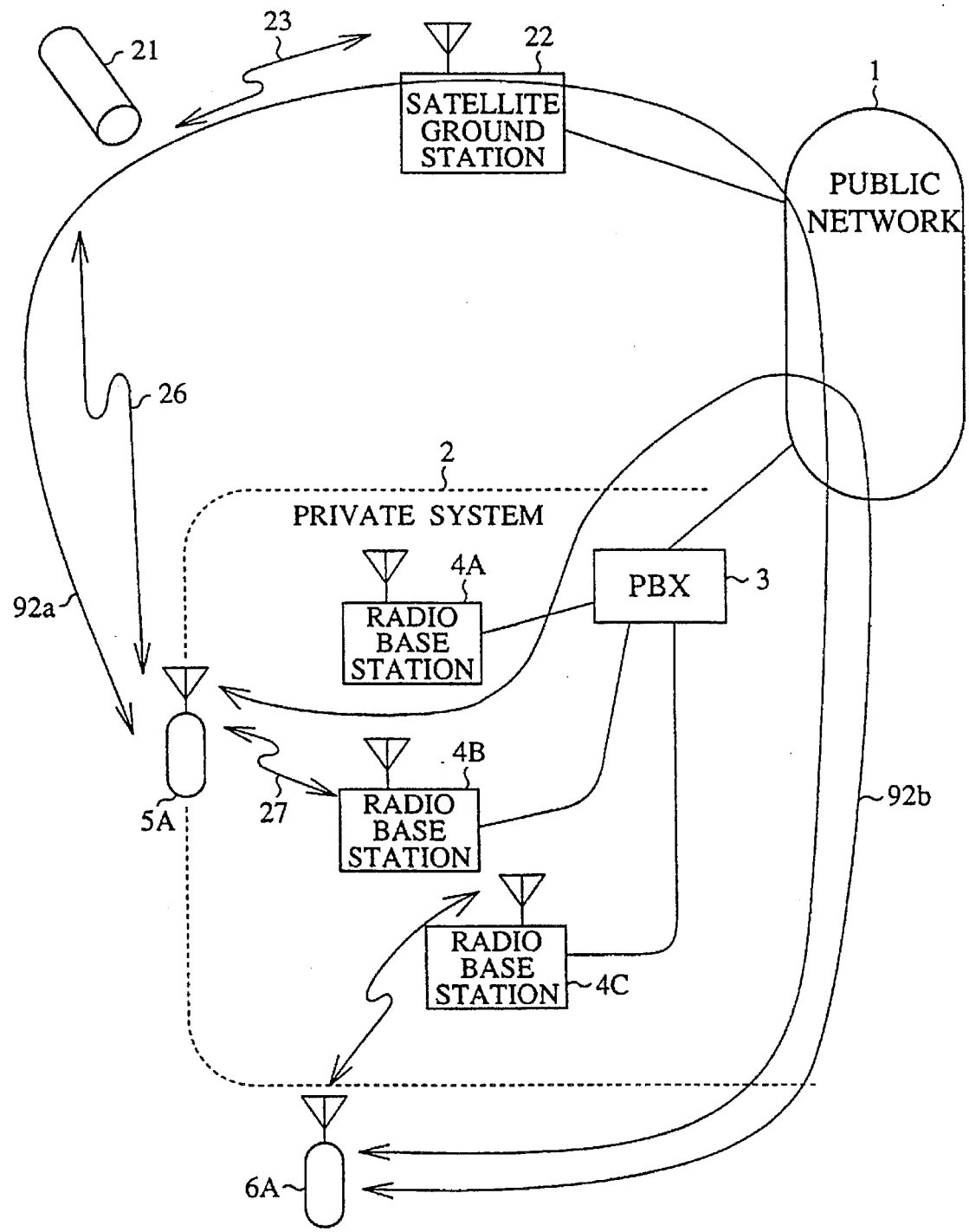
FIG. 29 shows the case where the mobile telephone of the private system is communicating with the mobile telephone which does not belong to the private system and the mobile telephone is roaming to the own private system during this communication.
Figure 30:
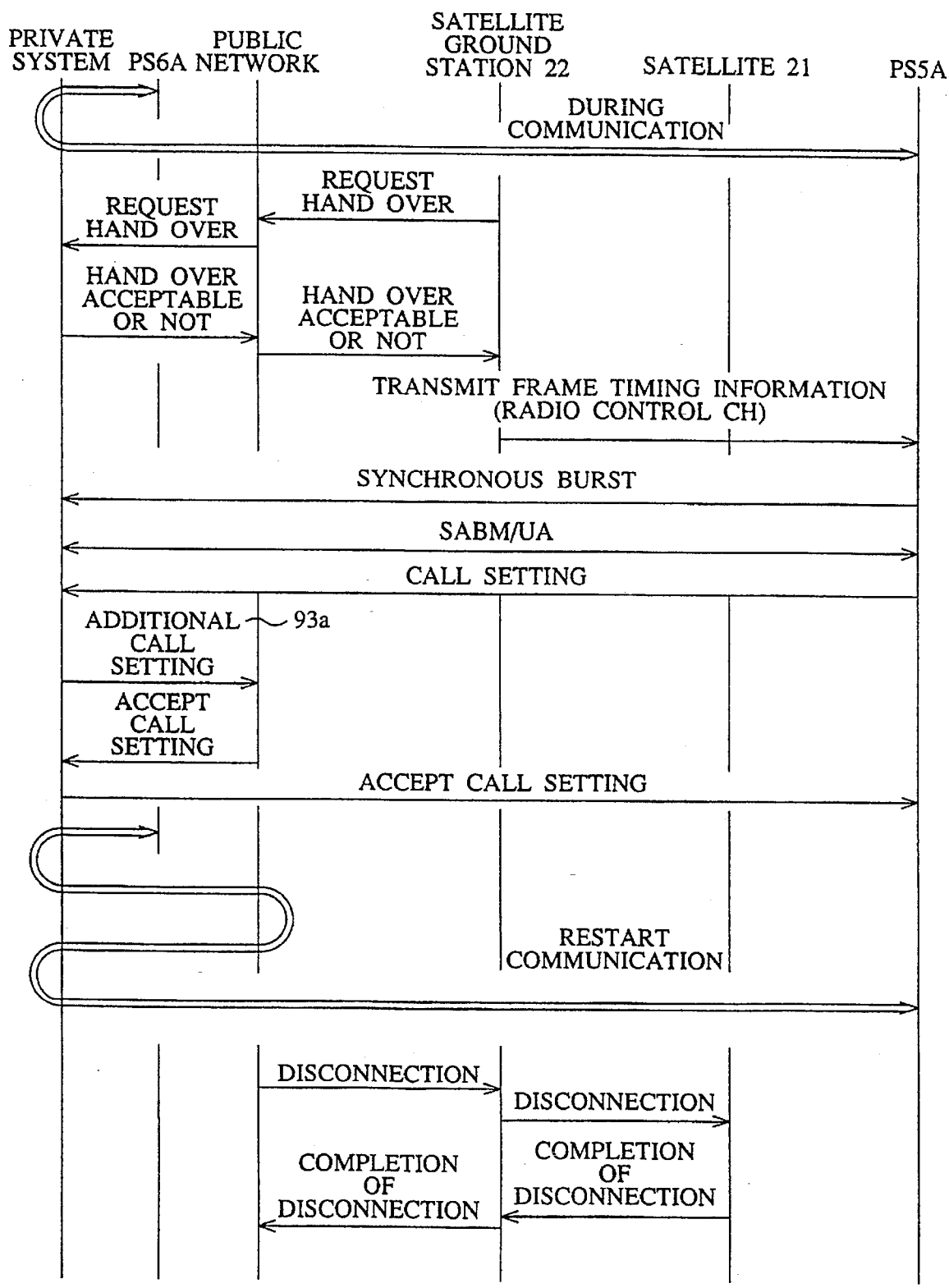
FIG. 30 is a protocol sequence diagram corresponding to the case described in FIG. 29.

Next, a description will be made to the case where the mobile telephone 5A of the private system 2 is communicating with the mobile telephone 6A which does not belong to the private system 2 and the mobile telephone 5A is roaming to the own private system 2 during this communication. FIG. 29 shows the above case and FIG. 30. is a protocol sequence diagram corresponding to the case described in FIG. 29.

As the mobile telephone 5A approaches the communication zone of the radio base station 4B in the private system 2, the radio base station 4B sends a receiving signal level report to the PBX 3. The PBX 3 instructs the other radio base stations adjacent to the radio base station 4B, which are included in the private system 2 to measure a receiving signal level of the radio waves transmitted from the mobile telephone 5A and to report the result of the measurement to the PBX 3. When the PBX 3 recognized that the communication within the private system 2 is possible based on the result of the measurement, the PBX 3 instructs the satellite ground station 22 to continue the present communication and the PBX 3 sends the hand-over acceptance or not information to the exchange station of the satellite ground station 22 via public network 1. When a line between the radio base station 4B and the mobile telephone 5A is set up, radio base station 4B sends the setting up information to the PBX 3, thereby the PBX 3 recognizes that the mobile telephone 5A belongs to the private system 2 and although the communication counterpart, the mobile telephone 6A, is within the private system 2, the mobile telephone 6A belongs to another system. Further, according to the protocol sequence of FIG. 30, the PBX 3 sends an instruction to change an accounting processing destination from the mobile telephone 5A to private system 2 as well as additional call setting 93a for the second line to the public network 1.

Figure 31:
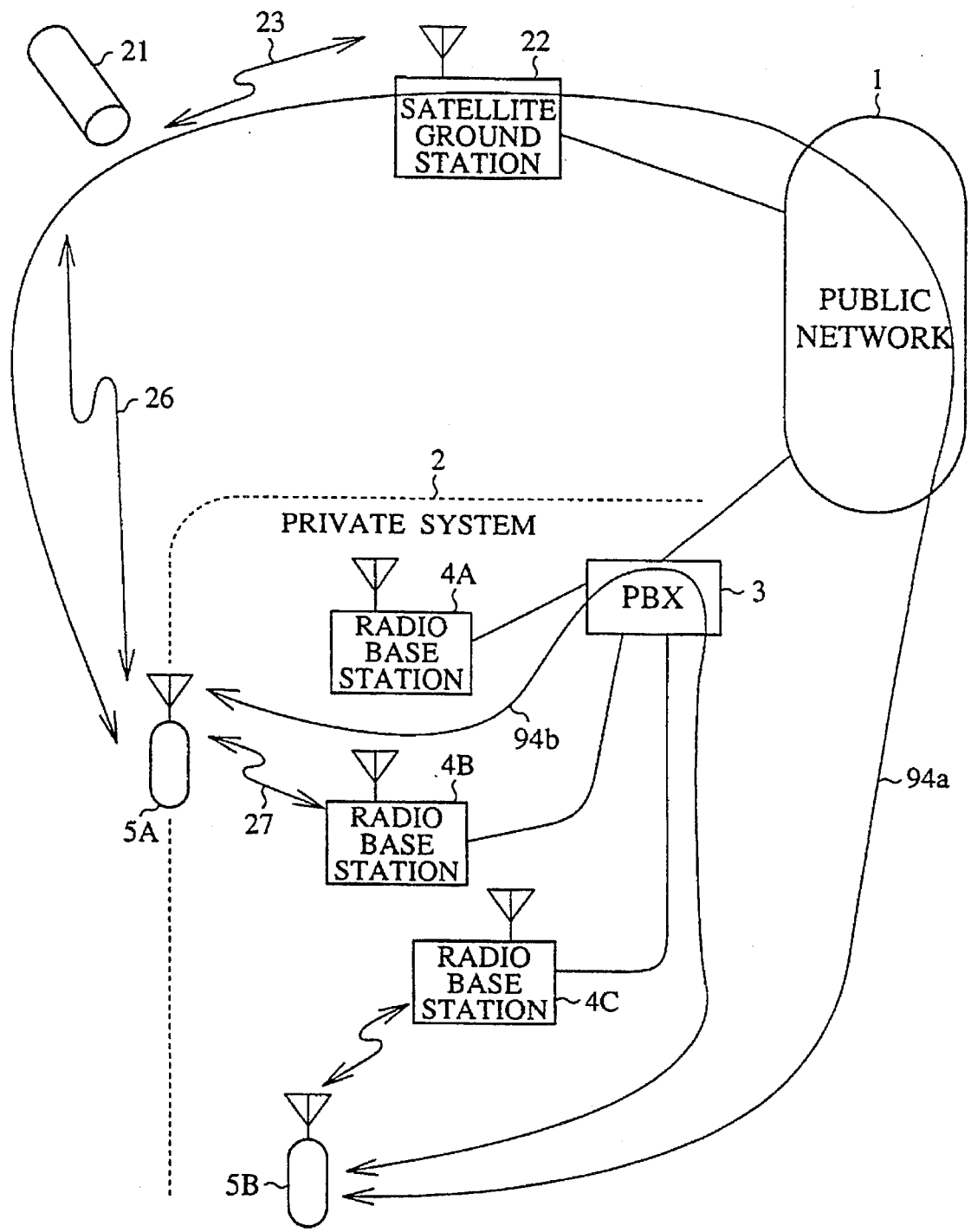
FIG. 31 shows the case where the mobile telephone belonging to the private system leaves the satellite system and moves into the own private system.
Figure 32:
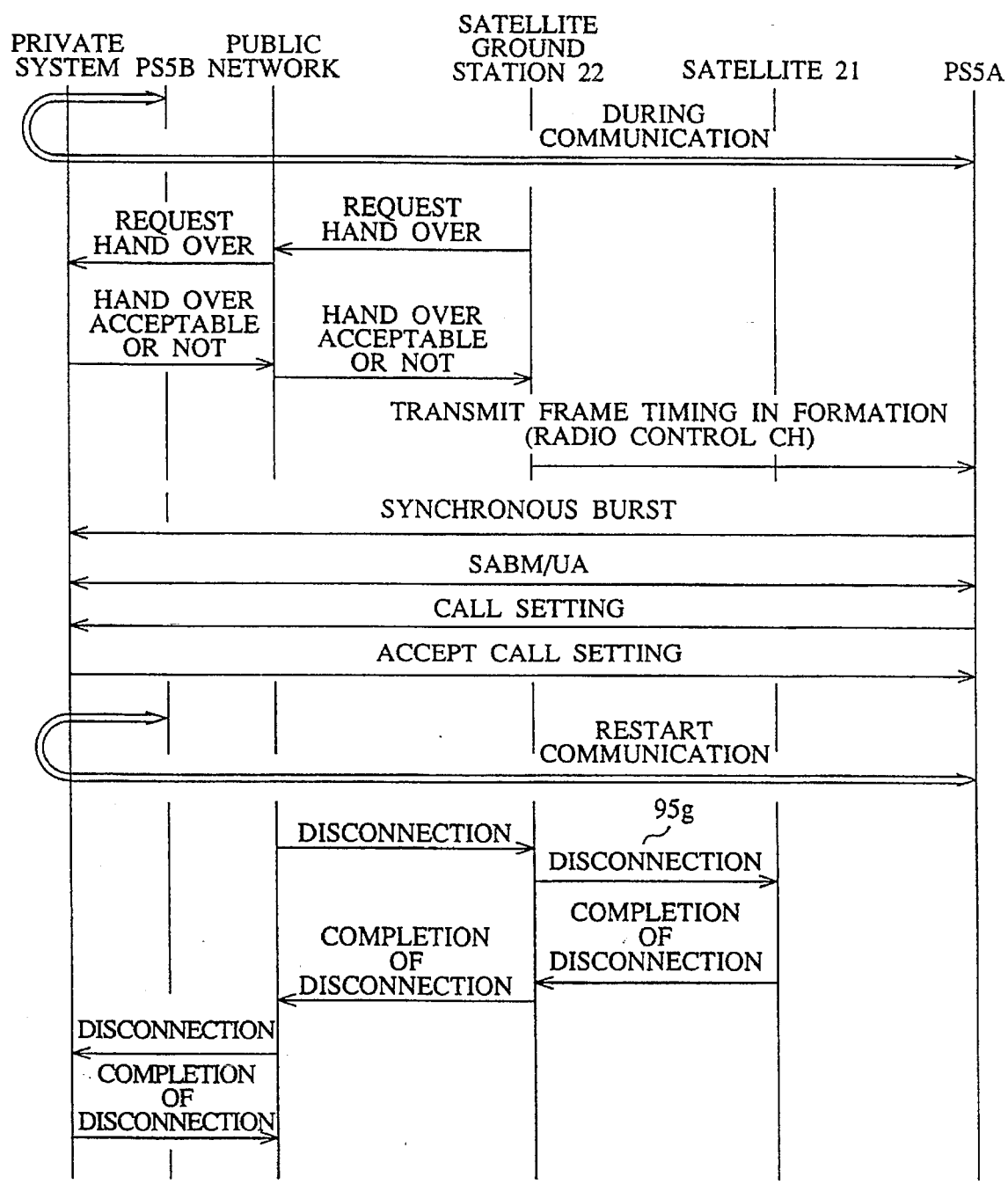
FIG. 32 is a protocol sequence diagram corresponding to the case illustrated in FIG. 31.

Next, a description will be made to the case where the mobile telephone 5A belonging to the private system 2 leaves the satellite system and moves into the own private system 2. FIG. 31 shows this situation and FIG. 32 is a protocol sequence diagram corresponding to the case illustrated in FIG. 31.

As the mobile telephone 5A approaches the communication zone of the radio base station 4B in the private system 2, the radio base station 4B sends a receiving signal strength report to the PBX 3. The PBX 3 instructs the other radio base stations near the radio base station 4B to measure receiving signal strength of the radio waves transmitted from the mobile telephone 5A. According to the result of the measurement, the PBX 3 judges whether the communication is possible within the private system 2 or not. When the PBX 3 judges that the receiving signal strength is not enough for a communication in the private system 2, the PBX 3 instructs the satellite ground station 22 via public network 1 to continue the communication using the satellite line 26. On the other hand, the PBX judges that the measured receiving signal strength is strong enough for starting a hand-over communication, the PBX 3 sends hand-over acceptable or not information to the exchange station of the satellite ground station 22 via public network 1. According to the protocol sequence of FIG. 32, a line between the radio base station 4B and the mobile telephone 5A is set up and call setting is sent to the PBX 3. Upon receiving the call setting, the PBX 3 recognizes that the mobile telephone 5A which is handed over belongs to the private system 2 and the communication counterpart, the mobile telephone 5B also belongs to the private system 2. Then, the PBX 3 disconnect the line between the satellite ground station 22 and public network 1 and the line between the public network 1 and the PBX 3 thereby the communication path 94a via the public network 1 is changed to the internal path 94b.

Next, a description will be made to the transfer of accounting information. Accounting destination mainly depends on the identifier of the mobile telephone 5A. It further depends on an identifier of a telephone with which the mobile telephone 5A communicates. Further, in detail, it depends on the system in which the mobile telephone 5A is communicating at present and the system to which the mobile telephone is handed over.

Figure 33:
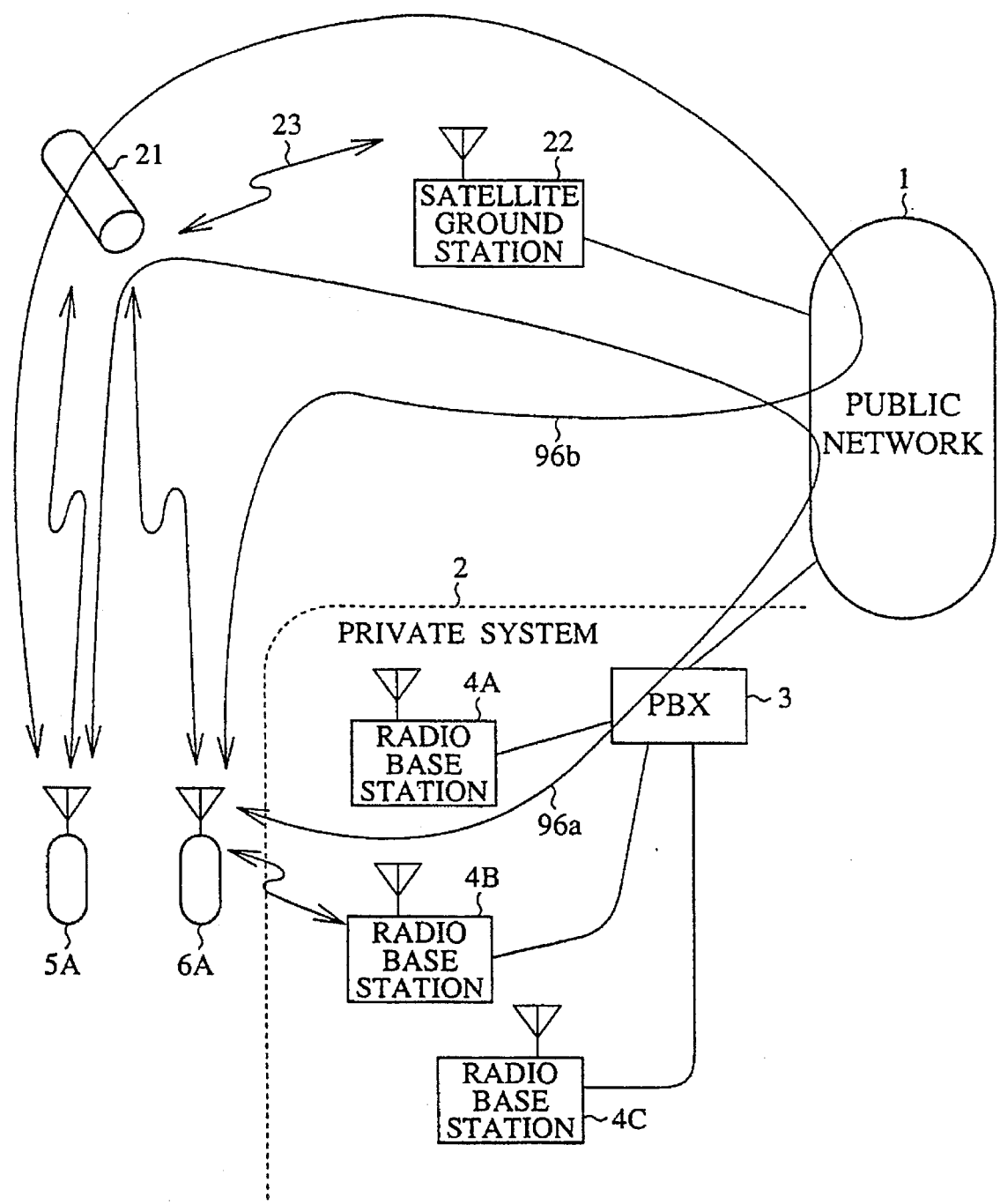
FIG. 33 shows a system configuration in the case where the mobile telephone belonging to the private system designates the mobile telephone itself as an accounting destination and roams from the private system to the public system.
Figure 34:
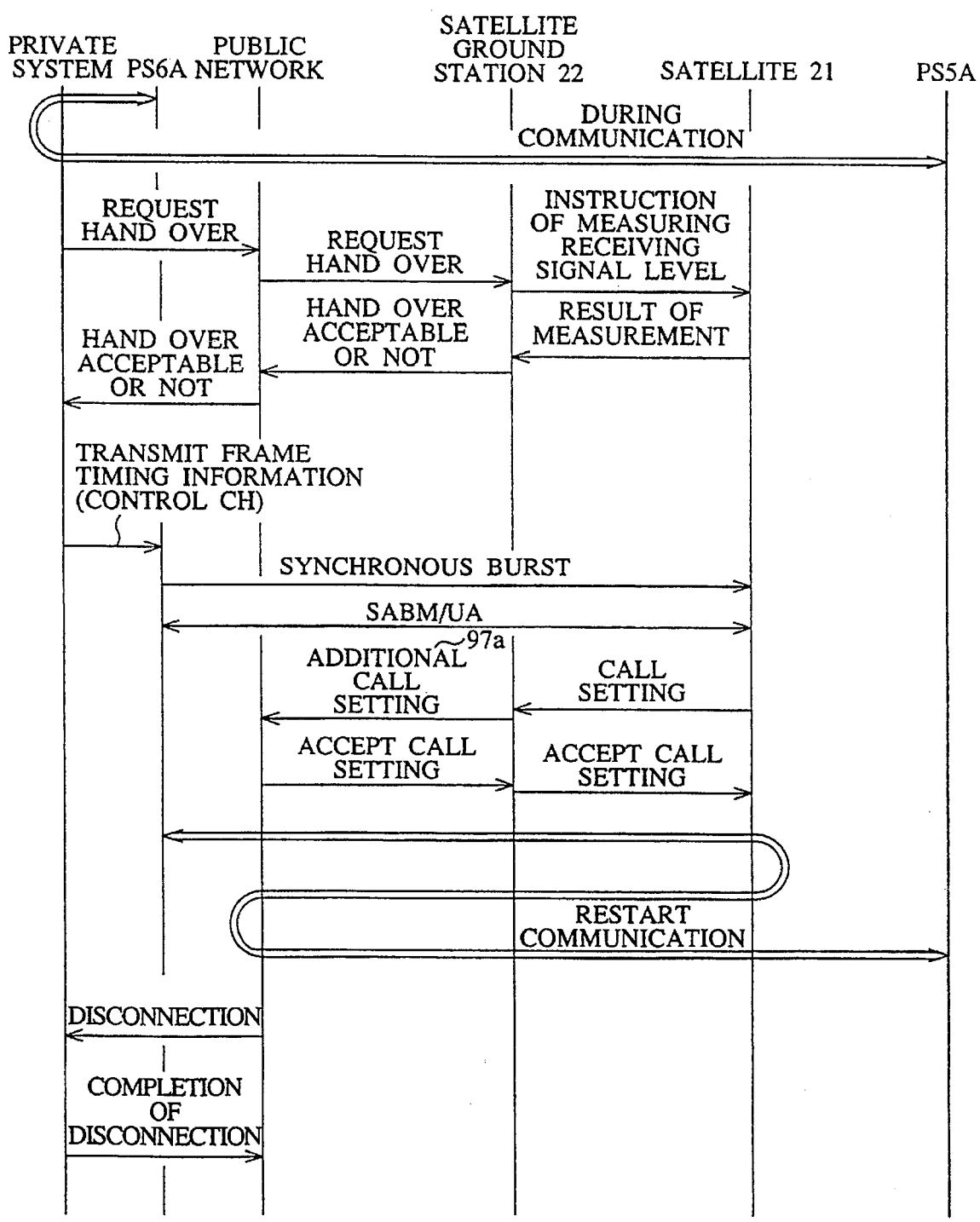
FIG. 34 is a protocol sequence diagram corresponding to the case described in the FIG. 33.

FIG. 33 shows a system configuration in the case where the mobile telephone 5A belonging to the private system 2 designates the mobile telephone 5A itself as an accounting destination and roams from the private system 2 to the public system 1. FIG. 34 is a protocol sequence diagram corresponding to the case described in the FIG. 33.

Assume that the mobile telephone 5A roams to the public network 1 and designates the mobile telephone 5A as an accounting destination when the mobile telephone 5A belonging to the private system 2 is connected to the mobile telephone 6A in the private system 2 on the communication path 96a.

In this case, the PBX 3 memorizes the mobile telephone 5A as an accounting destination. Then, the PBX 3 designates the mobile telephone 5A as an accounting destination when the mobile telephone 6A leaves the communication zone of the radio base station 4B and begins to roam to the satellite ground station 22. The designation of the mobile telephone 5A as an accounting destination is included in information necessary for roaming. In this case, two lines are set up between the public network 1 and the satellite ground station 22. Further, the additional call setting is performed according to the necessary procedures, thereby the communication path 96a is changed to the communication path 96b.

What is claimed is:

1. A mobile communication system, comprising:

a public communication network, a terrestrial private communication system connected to said public communication network, and a satellite communication system connected to said public communication network;

said terrestrial private communication system having a specific communication zone in which said private communication system is capable of providing communication services and including at least one terrestrial radio base station, at least one mobile communication device for communicating with said radio base station within said communication zone and for communicating with said satellite system, and private branch exchange means for performing communication processing between said private communication system and said public communication network such that said mobile communication device is capable of engaging in communication with subscribers of said public communication network through said private branch exchange means;

said satellite communication system including at least one orbiting satellite station for relaying radio waves through a satellite communication path, and at least one terrestrial satellite ground station for performing communication processing between said satellite communication system and said public communication network;

said mobile communication system functioning such that when said at least one mobile communication device moves outside of said communication zone and into an area which is not served by any terrestrial private communication system while engaged in communication with a subscriber of said public communication network through said private communication system, said private branch exchange means transfers information relating to said at least one mobile communication device to said terrestrial satellite ground station through said public communication network to cause said communication between said at least one mobile communication device and said subscriber to be handed off to said satellite communication system such that said communication thereafter passes through said satellite communication system instead of said private communication system.

2. A mobile communication system according to claim 1, wherein when said at least one mobile communication device is conducting a communication through said satellite system by radio wave and roams to said private system while performing said communication, said satellite ground station transfers information of said mobile communication device to said private branch exchange via said public network and communication between said mobile communication device and said public network is continued by setting up a radio line between said radio base station and said mobile communication device before disconnecting said mobile communication device from said satellite communication system.

3. A mobile communication system according to claim 1, wherein when an account destination at a time of issuing a call is said private system, said private branch exchange sends, to said public network, an instruction to change the account destination from said private system to said mobile communication device.

4. A mobile communication system according to claim 1, wherein when said mobile communication device roams to said satellite system while communicating with a telephone connected to said private system, if an account destination is said private system, said private branch exchange instructs said public network to connect to said satellite system and transfers account information of said private system to said public network, and if an account destination is changed to said mobile communication device, said private branch exchange transfers account information and roaming destination information to connect satellite system via said public network.

5. A mobile communication system according to claim 1, wherein when said at least one mobile communication device roams from said satellite system to said private system while communicating with a second mobile communication device which does not belong to said private system, said satellite ground station transfers information of said at least one mobile communication device to said private branch exchange, said radio base station transfers position information of said at least one mobile communication device to said private branch exchange, and if an account destination is said at least one mobile communication device, said private branch exchange sends, to said public network, an instruction to change the account destination to said private system and a line between said at least one mobile communication device to said second mobile communication device via said radio base station, said private branch exchange, and said public network is set up.

6. A mobile communication system according to claim 1, wherein when said mobile communication device roams from said satellite system to said private system while communicating with a telephone connected to said private system, said satellite ground station transfers information of said mobile communication device to said private branch exchange, said radio base station transfers position information to said private branch exchange, a radio line between said radio base station and said mobile communication device is set up, and said private branch exchange disconnects a line to said public network to change to an internal line within said private system.

7. A mobile communication system according to claim 1, wherein after said at least one mobile communication device roams to said satellite system designating said private system as an account destination while said mobile communication device is communicating with a second mobile communication device which does not belong to said private system and when said second mobile communication device also roams to said satellite system, said private branch exchange informs said public network that said at least one mobile communication device is an account destination.

\* \* \* \* \*

UNITED STATES PATENT AND TRADEMARK OFFICE
CERTIFICATE OF CORRECTION

PATENT NO. : 5,659,878
DATED : August 19, 1997
INVENTOR(S) : Yoshinori Uchida et al.

It is certified that error appears in the above-indentified patent and that said Letters Patent is hereby corrected as shown below:

Col. 2, line 37, delete "not"; Col. 3, line 25, "22" should be -- 221 --; Col. 5, line 56, "eXchange" should be -- Exchange --; Col. 9, line 4, "round" should be -- ground --; In the Claims: Col. 16, line 7 (claim 5), after "system" insert a comma.

Signed and Sealed this

Twenty-third Day of February, 1999

Attest:

Q. TODD DICKINSON

*Attesting Officer*     *Acting Commissioner of Patents and Trademarks*